US010722802B2

(12) United States Patent
Hingorani

(10) Patent No.: US 10,722,802 B2
(45) Date of Patent: Jul. 28, 2020

(54) AUGMENTED REALITY RHYTHM GAME

(71) Applicant: Silver Curve Games, Inc., Hoboken, NJ (US)

(72) Inventor: Sanjiv Chandroo Hingorani, Hoboken, NJ (US)

(73) Assignee: Silver Curve Games, Inc., Hoboken, NJ (US)

( * ) Notice: Subject to any disclaimer, the term of this patent is extended or adjusted under 35 U.S.C. 154(b) by 0 days.

(21) Appl. No.: 15/747,364

(22) PCT Filed: Jul. 22, 2016

(86) PCT No.: PCT/US2016/043636
§ 371 (c)(1),
(2) Date: Jan. 24, 2018

(87) PCT Pub. No.: WO2017/019530
PCT Pub. Date: Feb. 2, 2017

(65) Prior Publication Data
US 2018/0214777 A1    Aug. 2, 2018

Related U.S. Application Data

(60) Provisional application No. 62/196,454, filed on Jul. 24, 2015.

(51) Int. Cl.
*A63F 13/44* (2014.01)
*A63F 13/80* (2014.01)
(Continued)

(52) U.S. Cl.
CPC ............ *A63F 13/80* (2014.09); *A63F 13/213* (2014.09); *A63F 13/2145* (2014.09);
(Continued)

(58) Field of Classification Search
CPC ........ A63F 13/44; A63F 13/46; A63F 13/814; A63F 2300/8082
See application file for complete search history.

(56) References Cited

U.S. PATENT DOCUMENTS 8,444,464 B2 *   5/2013   Boch ..................... A63F 13/428
                                                            463/7
8,576,181 B2    11/2013   Cho
(Continued)

OTHER PUBLICATIONS

Nov. 29, 2016—International Search Report and Written Opinion of PCT/US2016/043636.

*Primary Examiner* — Omkar A Deodhar
(74) *Attorney, Agent, or Firm* — Banner & Witcoff, Ltd.

(57) ABSTRACT

An interactive rhythm game may provide an enhanced player experience by implementing one or more features described herein. For example, the variety of dance locations may be greatly enhanced by providing an augmented reality feature allowing the player to turn any real world location into a dance location in the game. As another example, an interactive rhythm game may allow a player to customize aspects of in-game avatars by allowing users to provide custom textures and define their own custom dance animations. As yet another example, an interactive rhythm game may adjust the difficulty and/or dance performance of an avatar based on one or more factors. As still another example, the interactive rhythm game may modify the augmented reality dance venue to include other characters and special effects based on the user's gameplay.

20 Claims, 14 Drawing Sheets

(51) Int. Cl.
    *A63F 13/2145*    (2014.01)
    *A63F 13/213*     (2014.01)
    *A63F 13/428*     (2014.01)
    *A63F 13/46*      (2014.01)
    *A63F 13/5255*    (2014.01)
    *A63F 13/537*     (2014.01)
    *A63F 13/577*     (2014.01)
    *A63F 13/92*      (2014.01)

(52) U.S. Cl.
    CPC ............ *A63F 13/428* (2014.09); *A63F 13/44* (2014.09); *A63F 13/46* (2014.09); *A63F 13/5255* (2014.09); *A63F 13/537* (2014.09); *A63F 13/577* (2014.09); *A63F 13/92* (2014.09); *A63F 2300/8047* (2013.01)

(56) References Cited

U.S. PATENT DOCUMENTS

| | | | |
|---|---|---|---|
| 8,788,973 | B2 | 7/2014 | Lavigne et al. |
| 2010/0009750 | A1* | 1/2010 | Egozy ............... A63F 13/005 |
| | | | 463/35 |
| 2010/0029386 | A1 | 2/2010 | Pitsch et al. |
| 2011/0007079 | A1 | 1/2011 | Perez et al. |
| 2012/0021833 | A1 | 1/2012 | Boch et al. |
| 2012/0046113 | A1 | 2/2012 | Ballas |
| 2012/0094730 | A1* | 4/2012 | Egozy ............... A63F 13/12 |
| | | | 463/7 |
| 2012/0289348 | A1 | 11/2012 | Ahmad et al. |
| 2014/0194171 | A1 | 7/2014 | Nicely et al. |
| 2016/0026253 | A1* | 1/2016 | Bradski ............ G02B 27/225 |
| | | | 345/8 |

* cited by examiner

AUGMENTED REALITY RHYTHM GAME

CROSS-REFERENCE TO RELATED APPLICATION

This application claims priority to U.S. Provisional Patent Application Ser. No. 62/196,454, filed Jul. 24, 2015, and entitled "AUGMENTED REALITY RHYTHM GAME," the disclosure of which is incorporated by reference herein in its entirety and made part hereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects of the disclosure relate generally to computer software utilizing augmented reality to combine virtual characters and/or experiences with real world settings. More specifically, some aspects of the disclosure provide an interactive rhythm video game offering enhanced player engagement through integration with a user's environment, interaction with other users in an augmented reality setting, responsive and dynamic character animations, and other features described herein.

BACKGROUND

Rhythm games are a genre of games that challenge a user to input commands in synchronization with music tracks, simulating the act of dancing and/or playing instruments. There remains, however, an ever-present need for more engaging and exciting gameplay experiences in rhythm games.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

An interactive rhythm video game may include a series of colorful beats (e.g., a graphical image of a musical note) that cross a touch-sensitive screen for a player to hit (e.g., by tapping or touching the screen) when the beat reaches a predetermined point in the display (e.g., when the animated note reaches a certain size and/or position as it approaches the player in a 3D environment). The beats may originate from a fixed (or variable) position on the screen (or in the environment), and may be arranged and/or timed to coincide with portions of an associated music track. As the player successfully hits beats in time with the music track (e.g., by tapping the beats at the appropriate time in the music), the rhythm game may animate an avatar of the player to perform one or more dance animations to help show the user how they are performing in the game. An interactive rhythm game may provide an enhanced player experience by implementing one or more features described herein. For example, the variety of dance locations may be greatly enhanced by providing an augmented reality feature allowing the player to turn any real world location into a dance location in the game. In such a feature, a mobile device's camera may capture an image of a room in which the player is located, and the mobile device may display that image along with superimposed virtual objects, such as the beats, dancing avatar(s), and/or other virtual objects, to thereby "augment" the reality of the image captured by the camera. As another example, an interactive rhythm game may allow a player to customize aspects of in-game avatars by allowing users to provide custom textures and define their own custom dance animations. As yet another example, an interactive rhythm game may adjust the difficulty and/or dance performance of an avatar based on one or more factors. As still another example, the interactive rhythm game may modify the augmented reality dance venue to include other characters and special effects based on the user's gameplay.

According to some aspects, the interactive rhythm game may reward players with game credits and/or currency used to unlock new features in the rhythm game and/or purchase items associated with the rhythm game/music. In some embodiments, the game currency may be a digital currency such as a cryptocurrency. The game credits and/or currency may be used, for example, to purchase and download the soundtrack to the rhythm game or tickets to music concerts and parties on a website associated with the rhythm game.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 7A:
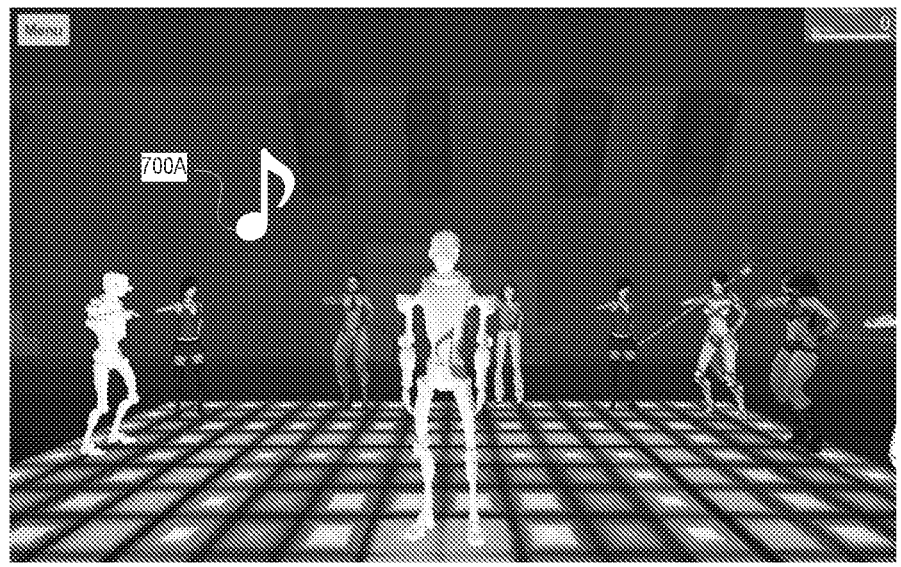
FIG. 7 illustrates a method of playing a rhythm game, according to aspects described herein.
Figure 7B:
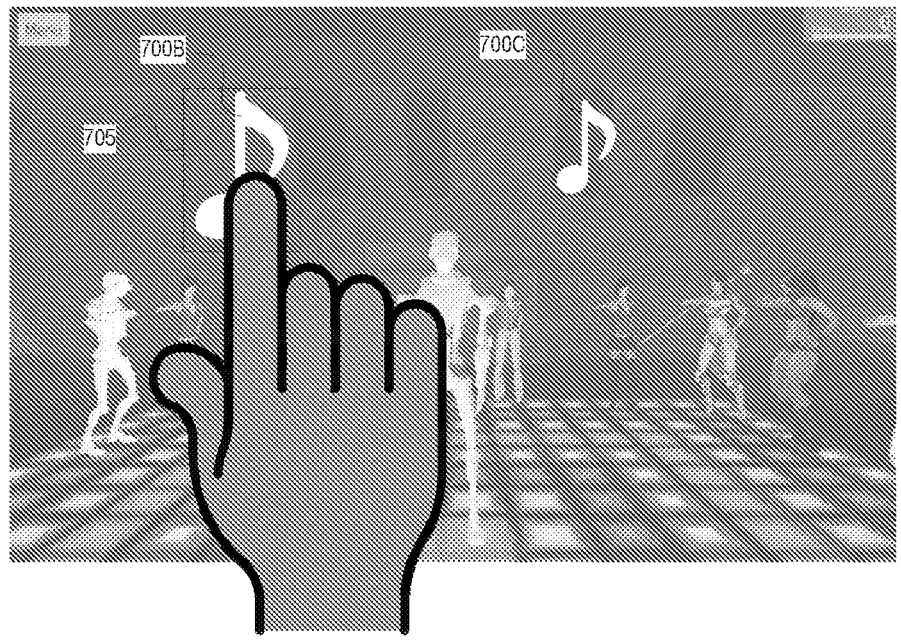

For general context, aspects described herein relate to a rhythm game on a mobile device, with an image as shown in FIG. 7A that appears on a smartphone touchscreen as the player holds a smartphone up with a rear camera facing a wall in a room. The FIG. 7A image may show what the mobile device's rear-facing camera detects, but with added images to simulate virtual objects being added to the real-world environment captured by the camera. So, in the FIG. 7A example, the player may be holding the smartphone up, and may see, on the mobile device's touch screen display, the actual far wall of the room in which the player is standing, but the image may be superimposed with the colorful floor pattern, dancing characters, and the note 700A. During the play of the game, a song is played for the user to hear, and the notes 700A will originate from a far point in the room, and will be animated to appear as if they are moving towards the user's camera. The notes correspond to selected notes in the song, and are animated such that the notes arrive at a predetermined position, or at a predetermined size, in time synchronization with a corresponding musical beat in the song. The player must touch the notes 700A when they arrive at that predetermined position or size, and the player's performance in the game is measured by determining how accurately the player accomplished this task for each note in the song. The player's performance may also be reflected by the behavior of the animated avatars in the room. In the FIG. 7A image, the centralized humanoid figure may be a virtual avatar that will move and dance in rhythm with the song, and based on the user's performance. If the user is accurately tapping on the notes in time with the music, then the avatar may engage in more complicated dance moves. If the user is inaccurately tapping on the notes, then the avatar may dance in a slower or otherwise different manner. The FIG. 7A example will be discussed further below, as this initial context is provided for basic context.

Figure 1:
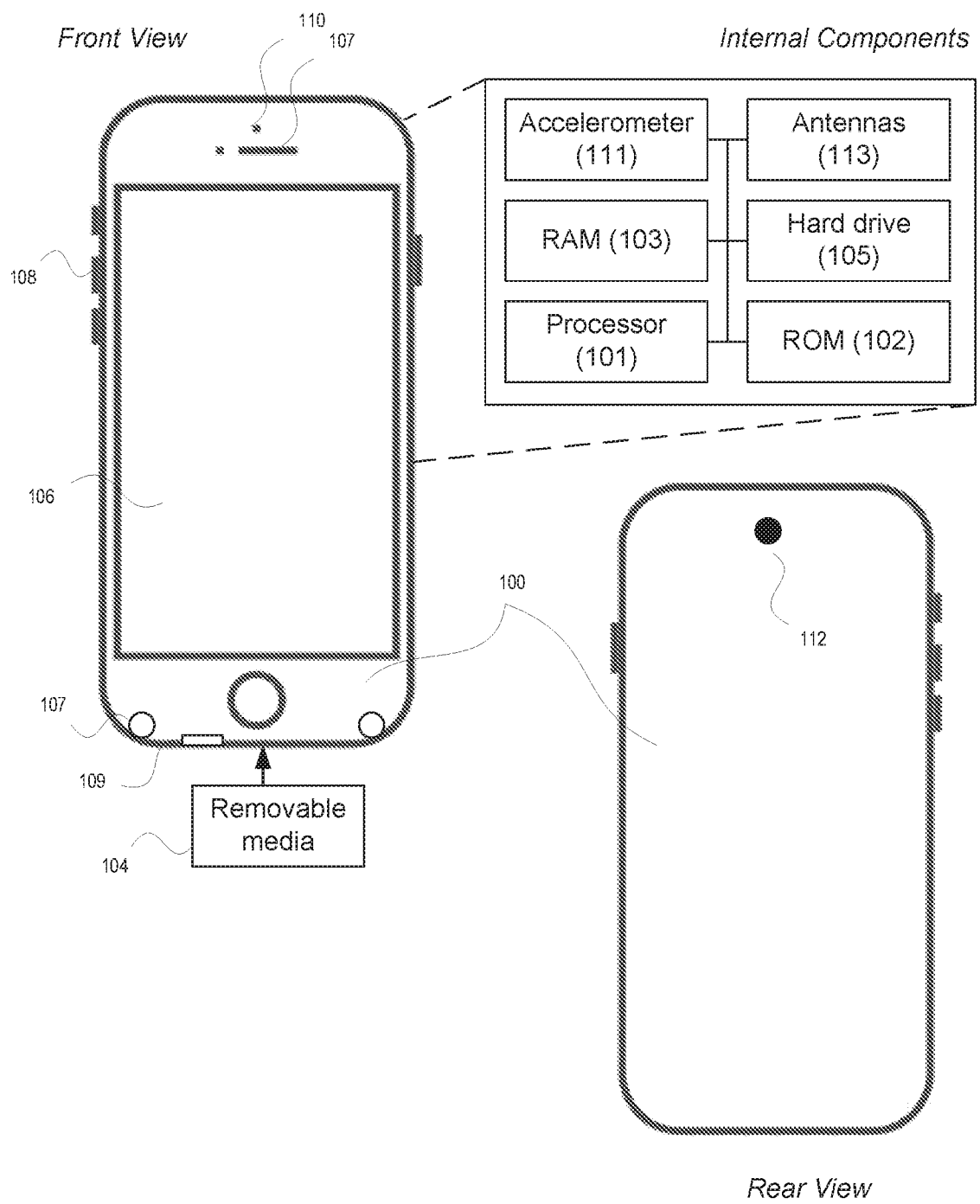
FIG. 1 illustrates general hardware elements that can be used to implement any of the various systems or computing devices discussed herein.

FIG. 1 illustrates general hardware elements that can be used to implement any of the various systems or computing devices discussed herein. A mobile computing device 100, which may be a smartphone, personal data assistant, portable computer, laptop computer, etc., may include one or more processors 101, which may execute instructions of a computer program to perform any of the features described herein. The instructions may be stored in any type of computer-readable medium or memory, to configure the operation of the processor 101. For example, instructions may be stored in a read-only memory (ROM) 102, random access memory (RAM) 103, removable media 104, such as a secure digital (SD) card, or any other desired storage medium. Instructions may also be stored in an internal hard drive 105.

The mobile computing device 100 may include one or more output devices, such as a display 106 or one or more audio speakers 107. There may also be one or more player input devices, such as a number of buttons 108, as well as a microphone 109, a touchscreen built into display 106, and/or a forward-facing camera 110 (which may include multiple cameras for three-dimensional operation) for player gestures. The mobile computing device 100 may comprise additional sensors, including but not limited to a multiple-axis accelerometer 111 or rear-facing camera 112. Rear-facing camera 112 may further be an array of multiple cameras to allow the device to shoot three-dimensional video or determine depth. The mobile computing device may further comprise one or more antennas 113 for communicating via a cellular network, Wi-Fi or other wireless networking system, Bluetooth, near field communication (NFC), or other wireless communications protocols and methods.

The FIG. 1 example is only one possible hardware configuration, and modifications may be made to add, remove, combine, divide, etc. components of mobile computing device 100 as desired. Multiple devices in communication with each other may be used, such as a mobile device in communication with a server or desktop computer over the Internet or another network, or a mobile device communicating with multiple sensors in other physical devices via Bluetooth, NFC, or other wireless communications protocols. Mobile computing device 100 may be a custom-built device comprising one or more of the features described above, or may be a wearable device, such as a smart watch or fitness tracking bracelet, with custom software installed, or may be a smartphone or other commercially available mobile device with a custom "app" or other software installed.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
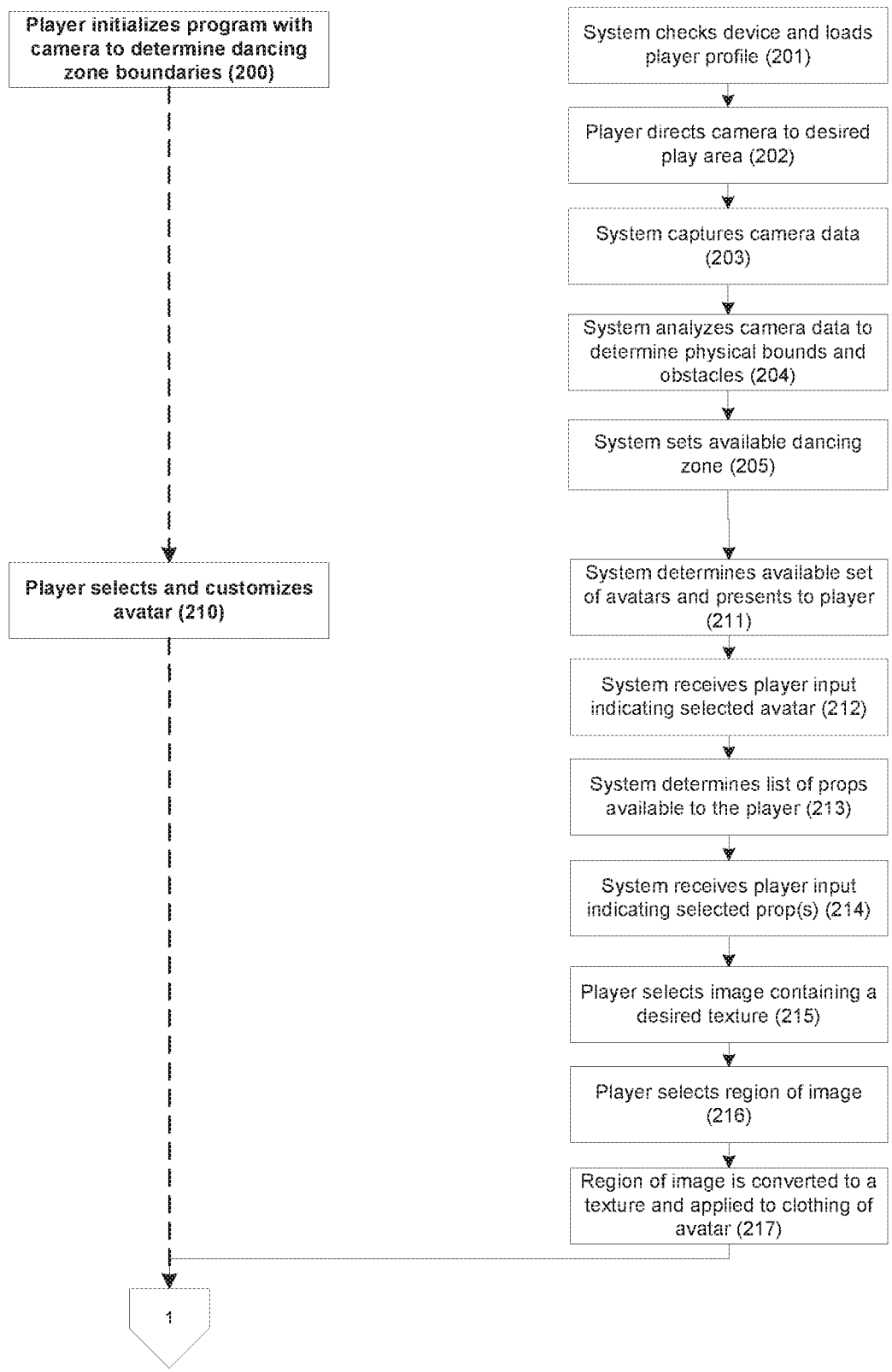
FIG. 2 illustrates a programmatic flow of an embodiment according to aspects described herein.
Figure 2B:
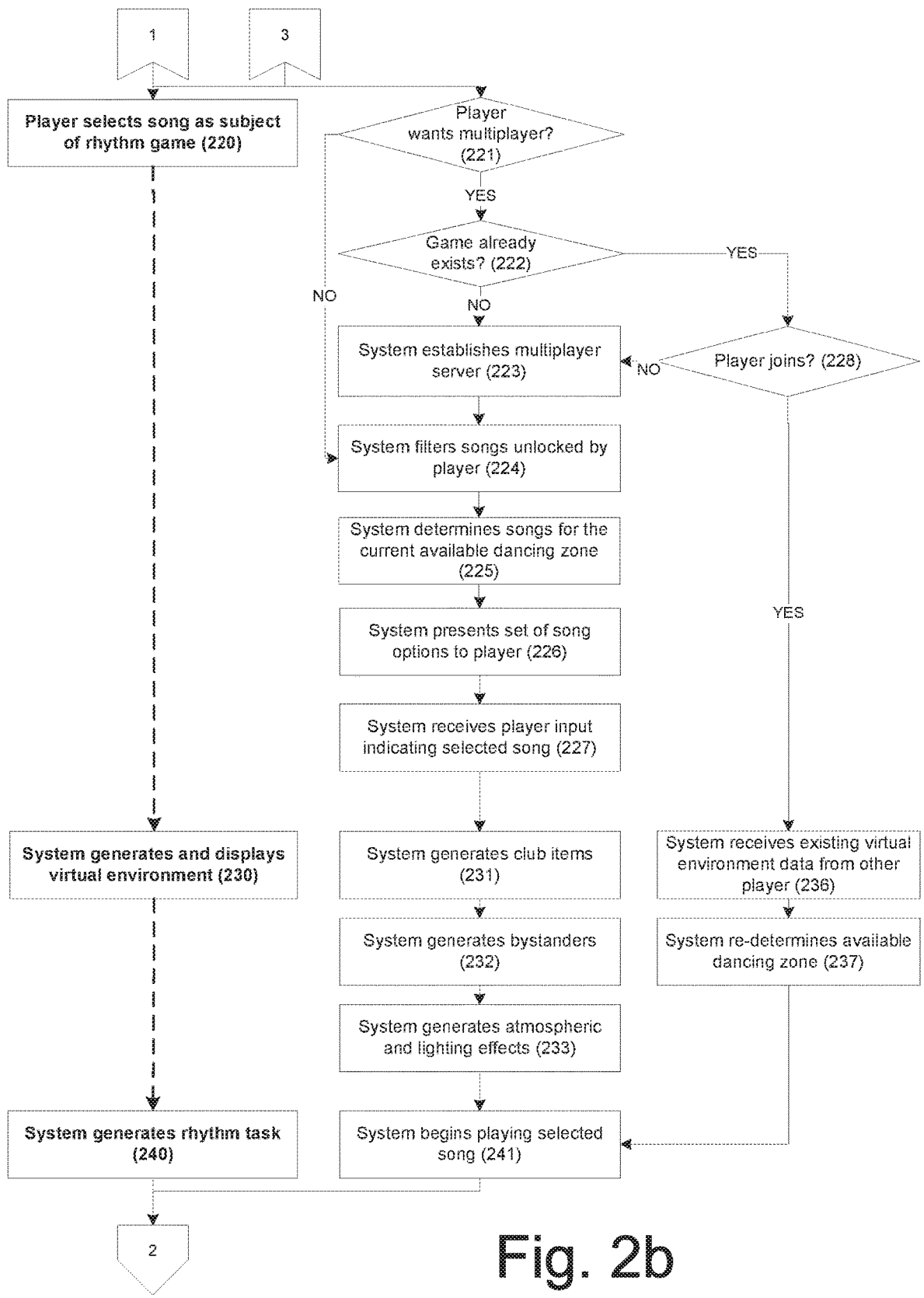
Figure 2C:
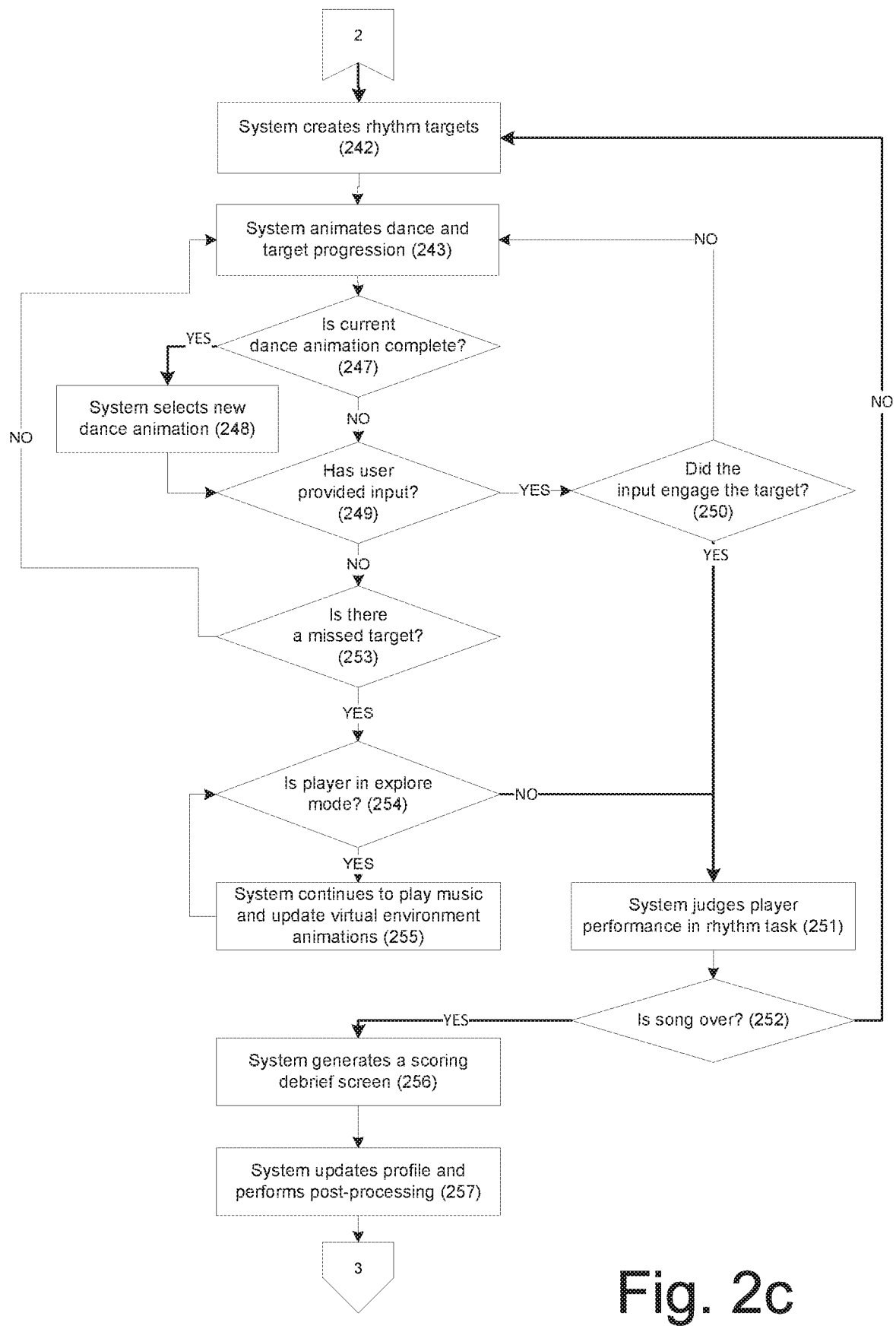

FIGS. 2a-c illustrates a programmatic flow of an embodiment according to aspects described herein. In the flow diagram, steps 200, 210, 220, 230, and 240 are generalized steps shown on the left, and correspond to more detailed sub-steps shown on the right. Some or all of the illustrated steps may be performed by a computing device, such as the one illustrated in FIG. 1, executing instructions stored on a computer-readable medium.

In step 200, which comprises substeps 201-205, a player of an augmented reality rhythm game may initialize the game and determine the zone within which the player's avatar may appear.

In step 201, the system may, as the program is launched, check the capabilities of the device that is running the program. This may comprise checking for the existence of and/or calibrating an accelerometer, checking for a rear-facing camera or cameras and determining whether the device is able to capture three-dimensional images, and checking the available volatile memory, storage memory, or processing power of the device. The system may also load a player profile associated with the player, which may comprise past scores, past performances, unlocked content such as avatars, songs, props, or other features, accumulated in-game currency, preferred avatar selection, or other player-set options.

In step 202, the player is instructed to direct the rear-facing camera towards an area that the player wishes to augment with the augmented reality features of the game. For example, the player may be standing in a room, and may point the camera towards a corner of the room, to indicate that the player wishes to use that corner as the environment that will be augmented by the dancing game. Alternatively, the player may be standing in a large, open room such as an auditorium or stadium with a wide open area to be used for the game, may direct the camera towards a ceiling of a room, or may stand outside and direct the camera towards the sky, towards a body of water, or towards another open space.

Figure 3A:
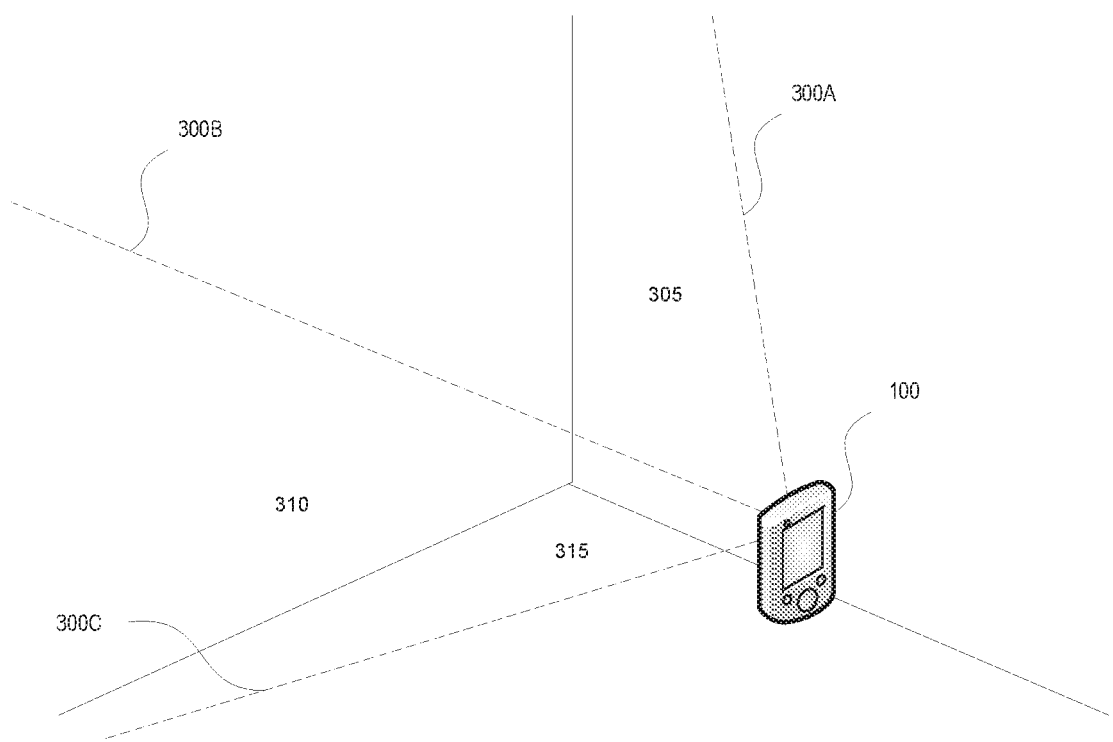
FIGS. 3a-d illustrate an initialization process for determining an available dancing zone according to aspects described herein.

In step 203, also illustrated by FIG. 3a, the system captures data from the camera to be used in determining features of the area desired by the player. The visible region from the camera's perspective (bounded by edges 300a-c) may comprise a side wall 305, a far wall 310, a floor 315, and/or other physical bounds or obstacles such as furniture or persons.

Figure 3B:
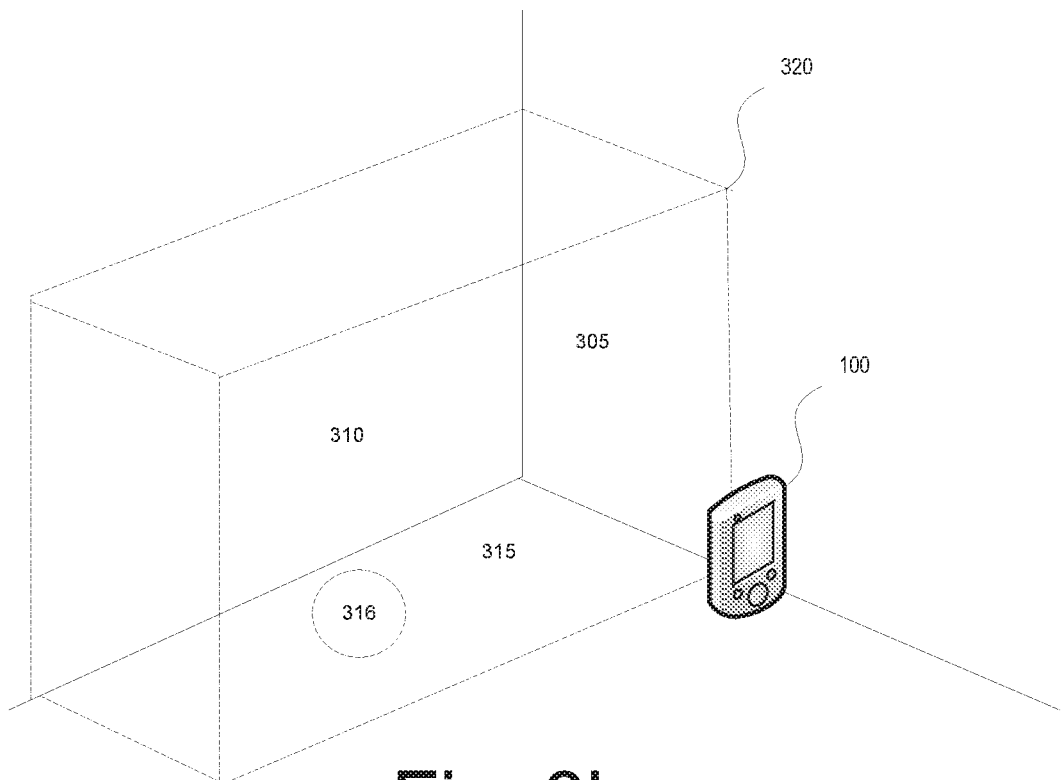

In step 204, also illustrated by FIG. 3b, the system analyzes the camera data to determine a bounding region for a zone available for the player's avatar to dance within. Walls, floors, ceilings, and other boundaries may be detected via image analysis of the video from the camera, such as by analyzing how surfaces appear to be illuminated or the edges between surfaces that meet such as the edge between the floor and a wall. Alternatively, boundaries may be more precisely determined by gathering input from a three-dimensional array of cameras rather than a single camera of the mobile device to determine a depth to each of the boundaries via triangulation. Any desired technique for recognizing walls, shapes, objects, space, volume, etc. may be used.

The zone may be set as the greatest volume within the camera's perspective that does not intersect any physical bounds. For example, the zone may extend in the x-direction from the left edge of the perspective to the detected wall 305, the zone may extend in the z-direction from the detected far wall to a predetermined distance short of the mobile device itself, and the zone may extend in the y-direction from the floor 315 to the upper edge of the perspective. Alternatively, the zone's dimensions may be indicated by the user, and/or the game may be configured with a predetermined volume (or minimum volume) that will be used. In the FIG. 3b example, the user's computing device may determine to use volume 320 to be the volume or dancing zone in which the dancing game's augmented reality features will appear. The targets, dancing avatars and other virtual objects discussed below may be added to the device 100 displayed image of the environment.

Figure 3C:
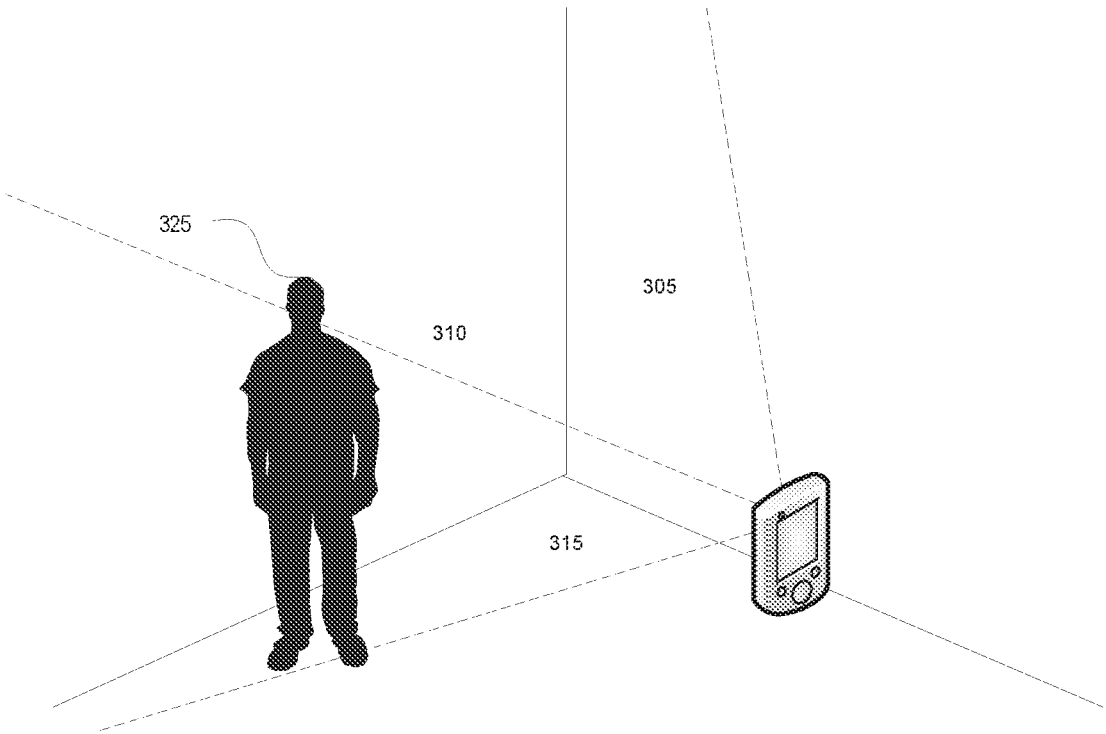
Figure 3D:
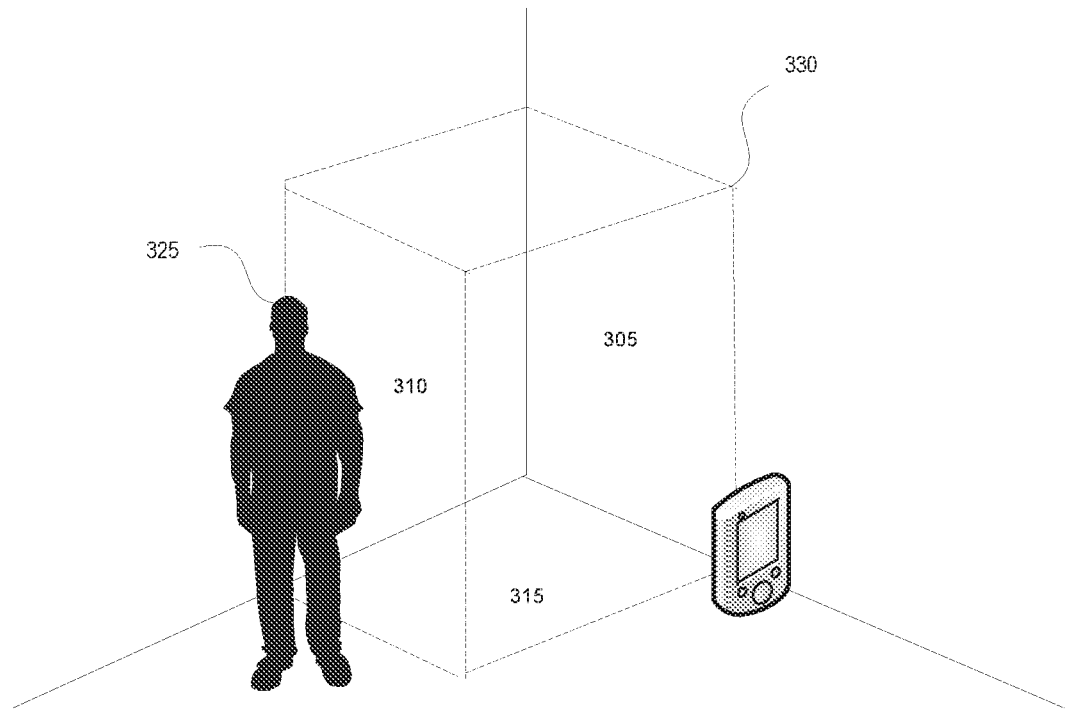

In capturing this initial environment, the computing device may identify objects that are in the room. For example, in FIG. 3c, a person 325 may be detected as an object within the camera's perspective. The system may analyze the video input to determine the location and dimensions of the person. In some embodiments, the computing device may determine its dancing environment to avoid objects (or certain types of objects, such as other people or objects larger than a predetermined size). In the FIG. 3d example, a new dancing zone 330 may be determined which is similarly dimensioned to dancing zone 320, but further bounded on the left by person 325.

The determined dancing zones may be rectangular prisms, spheres, cylinders, or even concave solids which are shaped around obstacles like person 325 rather than limited to no further than the obstacle in the given direction. As noted above, in some embodiments the dancing zone 320 may avoid certain types of objects, so that an avatar generated therein may appear to dance around, as if in the real environment, without intersecting with any physical objects (although some objects, such as floors and walls, may remain for interaction). However, as will be discussed further below, some embodiments may incorporate detected physical objects such as furniture as part of the game.

In step 205, the system may save, in memory, information indicating the available dancing zone. Alternatively, the system may display the determined available dancing zone to the player via a display of the mobile computing device, and allow the player to confirm the dancing zone, edit the dancing zone, or move to a new location to try to set a different dancing zone. The player may edit the dancing zone to extend it beyond a falsely determined boundary, or may be willing to sacrifice realism in order to have a larger available dancing zone that extends beyond even the physical walls of the room, and thus may extend the dancing zone beyond a truly determined boundary.

The system may also set an avatar center point or anchor 316 where the avatar may begin dancing, and upon which dance moves of the avatar may be centered. This point 316 may also be the point from which musical notes, or beats, will originate during the course of the rhythm game. Alternatively, the player may view the avatar center point or anchor and edit it for aesthetic or gameplay reasons, if preferred.

In step 210, which comprises substeps 211-217, a player may select and customize their avatar. As will be explained below, a player's avatar may be added to the image of the environment, to thereby augment that environment with a virtual image that will dance and move to reflect the player's performance in playing the rhythm game. If the player does well, and successfully touches the beats at their appropriate time, then the player's avatar may engage in more advanced dance moves. If the player does poorly, by failing to touch the beats at their appropriate time, then the avatar may dance in a simpler fashion or fail to dance at all.

Figure 4A:
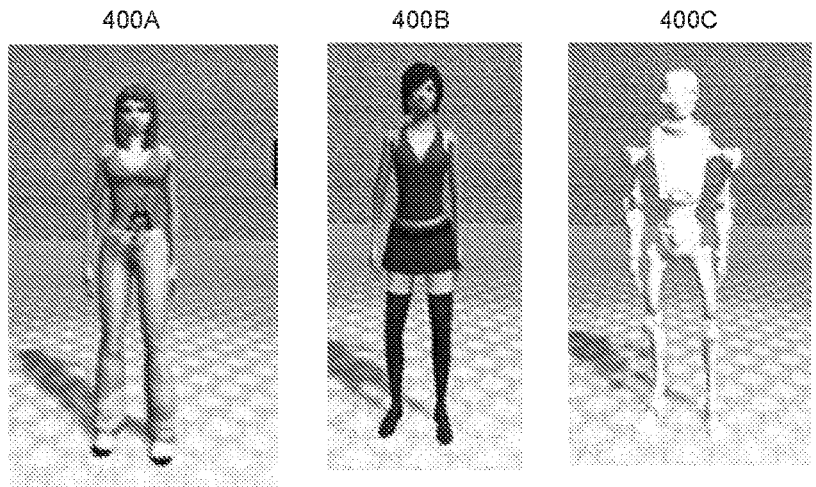
FIGS. 4a and 4b illustrate aspects of an avatar selection and customization process according to aspects described herein.

In step 211, the system may determine an available set of avatars to present to the player for selection. Some sample avatars are illustrated in FIG. 4a. The game may have a number of default avatars 400a-c, and may further have a number of unlockable or purchasable avatars that the player may have previously obtained and which may have been noted during player profile loading in step 201.

In step 212, the player may select an avatar to be used for the current gameplay session.

In step 213, the player may be presented with a set of available interactive props (such as chairs, tables, crates, wild costumes, etc.) that increase a dancing ability of their avatar and improve their gameplay performance score. In some embodiments, players may select only one item from each of various categories, such as furniture, accessories, props, and the like. Alternative embodiments may allow any number of these items to be selected. Players may purchase these items with in-game currency, real money, or may acquire items though good performance during game sessions, for example.

When players play against each other, the props may help them defeat a superior opponent because of a bonus entertainment value associated with the props and a corresponding score modifier. For example, as the player plays the game, the touch targets (e.g., targets 700*a-c*) may collide with props in the zone, and change course. This makes the touch targets harder to accurately tap, and in turn a successful tap of such a touch target may yield more points than other touch targets that did not change course. Players may receive props at random throughout the game if they perform well during a game session, such as where a spectator character tosses an item to the avatar in response to the player performing well in hitting beats with good timing.

In step 214, the player may select one or more props, and the selection will be stored by the system to be used when the rhythm game actually commences.

Figure 4B:
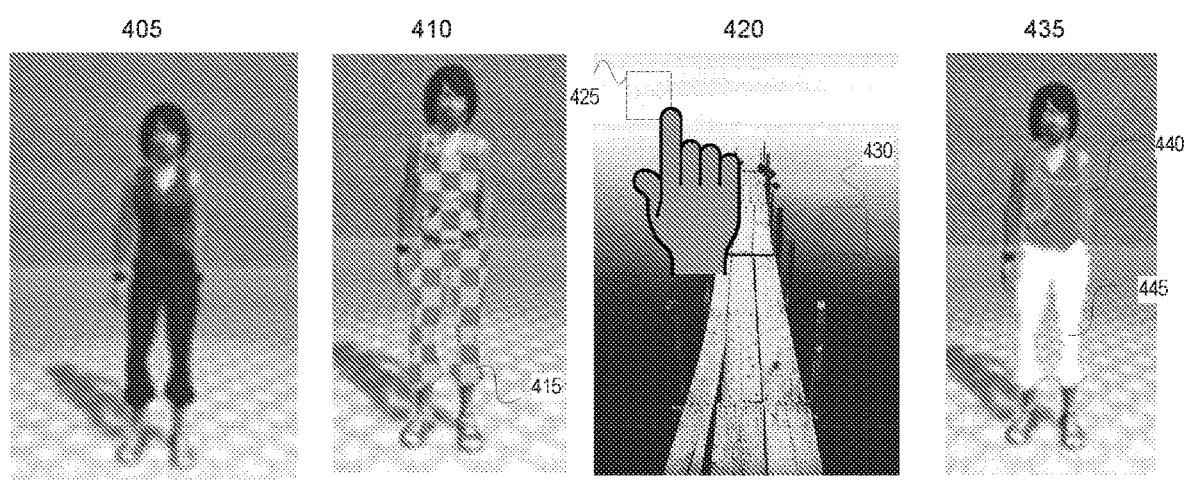

In step 215, the player may optionally customize their avatar by selecting textures from images stored and/or otherwise available to the computing device. This process is also illustrated by FIG. 4*b*. After confirming that customization is desired, a player's view of the unchanged avatar 405 may be replaced with a view 410 showing a pattern 415 to indicate what clothing of the avatar's may be modified. A player may then capture an image 420 from the camera or load image 420 from memory of the computing device, including for example from a photo gallery app.

In step 216, the player may be able to select one or more regions 425 or 430 of the image, which may be converted by the program to a texture suitable for use on a three-dimensional surface.

In step 217, the textures may be wrapped around the avatar to change the color or pattern of the avatar's top clothing 440 and/or bottom clothing 445, resulting in view 435. Players may be able to upload their styles to a server so that other players may access their customized designs. Players may similarly be allowed to import an image of themselves into the game. The computing device may then incorporate the image of the player into the game displays, such as by presenting a representation of the player in the background as a spectator character.

In step 220, comprising substeps 221-228, the player may select a song to which their avatar will dance as they play the rhythm game.

In step 221, the player may be prompted whether they wish to play in a multiplayer mode, or only a single-player mode. The rhythm game may be a one or two player dance game where users can play against dancers in different dance clubs and earn rewards for hitting the right beats with good timing synchronized to music tracks in the game. Players may be able to play over the internet and challenge other players. Each player may take turns trying to beat their competitor by matching their score in accurately responding to targets which must be engaged in time with the beats. The winner may win a reward based on a difficulty of the series of rhythm game and/or level of competition.

If the player has selected multiplayer mode, then in step 222 the system may check whether other multiplayer games have already been set up that the player may join and challenge to a one-on-one or multiple-player competition. A list of such games may be presented to the user, along with an option to decline all of them. In some embodiments, the rhythm game may locate other players within a certain radius of a player (e.g., by sharing global positioning information with a central server). For example, the rhythm game may assess who is in a 10 mile range of the computing device and who is online playing the game currently. The range could also be as small as a number of meters, in order to have competitors competing only if they are in the same physical room. Alternatively, the system may determine that a friend of the user has started a multiplayer game that is available to join (e.g., by checking with a game server, as will be noted below).

In step 223, if there are no multiplayer games, or the player declines to join an existing one, the system may establish its own multiplayer server process and begin broadcasting invitations for other players seeking a multiplayer mode to join. The system may also contact a centralized server to post the game's existence and location to facilitate others' joining. The server may have the same components as the device shown in FIG. 1, although it may be a larger scale computing device.

In step 224, the system may begin determining what song will be played during the current rhythm game. The first determination is the set of songs available to the player, which may include both a default set of songs and additional songs that have been unlocked or purchased.

In step 225, the set of available songs may be further restricted based on the available dancing zone (e.g., 320, 330) previously determined. Certain songs may be associated with minimum dancing zone volumes to ensure that an avatar is able to dance around in the available dancing zone. For example, a first song may be determined to be a song that will involve more energetic dancing, and as such may require a larger dancing zone. The system may store information indicating, for example, that the first song requires a minimum set of volume dimensions (e.g., 10 ft.×10 ft.×10 ft., or other predetermined volume). The available songs may also be limited based on physical objects that are detected in the available dancing zone, and/or virtual objects or props that are to be added to the dancing zone. For example, the system may store, in memory, information indicating that a first song requires the availability of a corner of a room, or a chair of a minimum height, so the virtual avatar can perform its dances. The available song may also be limited based on the depth of the room. For example, since the rhythm game shows beats animating towards the user's perspective, there may be a minimum amount of distance that the beats are to travel to arrive at the appropriate tapping position. In some embodiments, the available songs may depend on the geographic location (e.g., geographic positioning system—GPS—coordinates, or different physical rooms within an establishment, etc.).

In step 226, the player may be presented with the determined list of the songs available and suitable to the dancing zone, and in step 227, the player may select one of them, which the system will receive and store for when the rhythm game begins.

Figure 5:
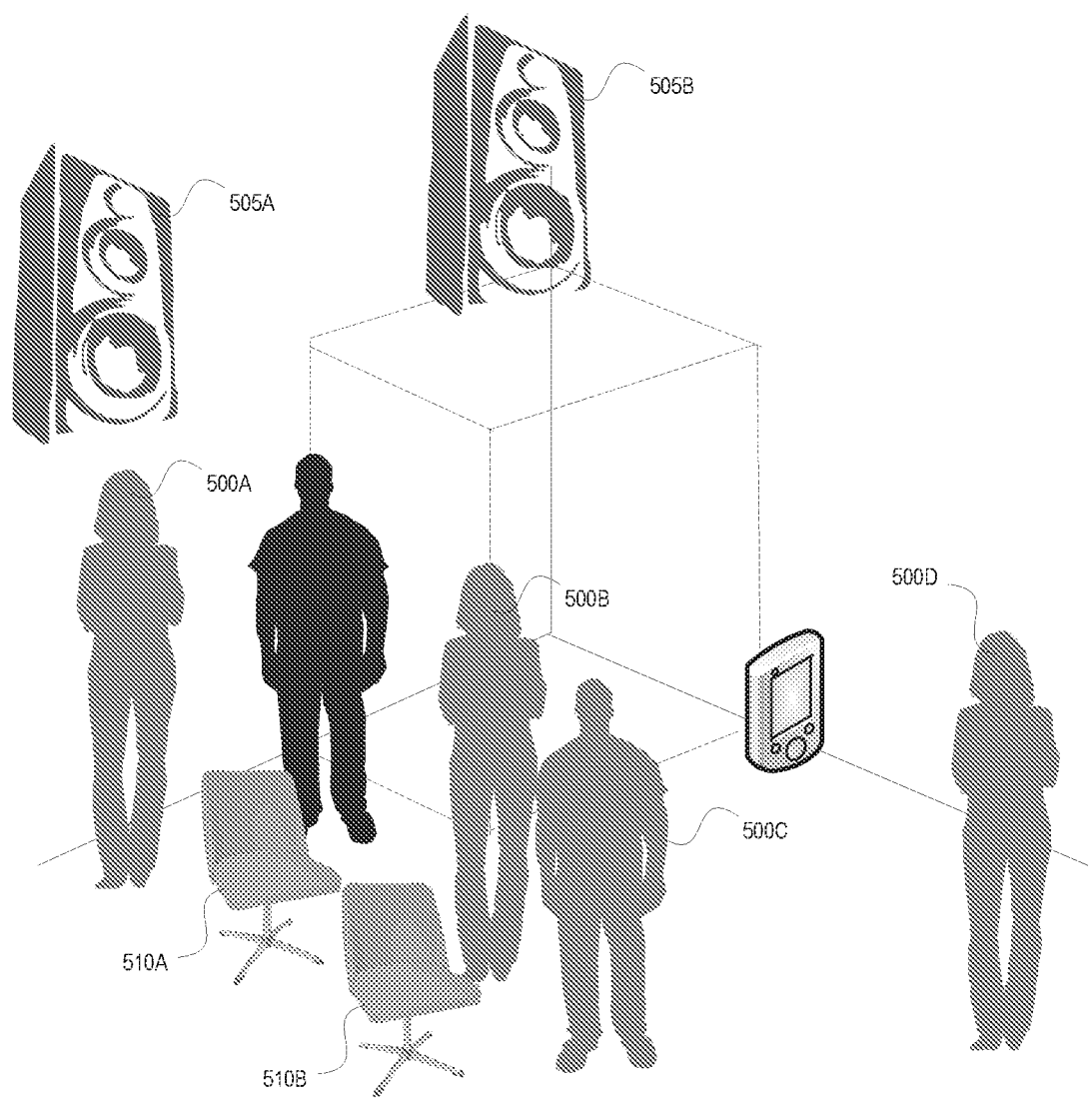
FIG. 5 illustrates a possible generated virtual environment to accompany an avatar during play, according to aspects described herein.

In step 230, which comprises some of substeps 231-233 and 236-237, the system may generate a virtual environment to be displayed to the player and in which the avatar may dance. An example virtual environment is illustrated in FIG. 5.

In step 231, the system may generate a number of club items, such as furniture 510*a-b*, speaker systems 505*a-b*, or other features such as a dancing floor, bar, artwork, sculptures, fountains, curtains, etc. The club items may be virtual objects that are superimposed, by the computing device, on the image of the environment captured in step 203 above. In the FIG. 5 example, the walls and floor of the room may be physically detected by the system, and shown in the image presented to the user via the display, but virtual speakers 505*a-b* may be added to that image by the system. So as the player views the image on the display of their mobile device, the player sees the image of the walls and floor captured by the camera, with the speakers 505*a-b* superimposed at certain positions on the wall as shown. As will be noted below, in some embodiments, the addition of these virtual objects may affect the gameplay (e.g., the beats may bounce off of virtual objects, making them harder to accurately touch, and thereby increasing the difficulty of the game and yielding a greater score for a successful touch).

In step 232, the system may also generate a number of virtual bystanders or non-player characters (NPCs) 500*a-d* to add to the environment. These NPCs may be other avatars that were not selected by the player, other characters that can never be selected as avatars, or even custom characters created by a player in step 217. As the player performs the rhythm game and the avatar dances, NPCs may interact with the avatar, including, for example, watching, cheering, commenting on performance, dancing with the avatar, or moving around the virtual environment.

The virtual environment may extend in every direction from the player, not only within the camera's perspective, such that elements like chair 510*b* or NPCs 500*c* and 500*d* may not initially be within view. As the game progresses, a player may be able to pivot the camera to see in all directions and explore the created virtual environment, and as the user pivots the camera, additional objects (both physical and virtual) may appear in the image shown to the user.

In step 233, the system may generate a number of atmospheric or lighting effects for the virtual environment. The lighting effects may seek to match those detected by the camera, such as creating a club scene whose brightness or coloration of lighting match the lighting in the room of the player. Alternatively, a club scene may be very different from the room of the player, such as a brightly-lit environment when the room is dark, or a dark club scene in a brightly-lit room. To increase immersion, lighting effects such as shadows or the direction of the lighting in the player's room may be preserved in the virtual environment.

According to some aspects described herein, a computing device presenting an interactive rhythm game may provide an enhanced player experience through use of a virtual reality environment. The rhythm game may present a dance venue having the player's avatar, other characters, other avatars, special effects, items, and other objects to create the appearance of an interesting and exciting dance venue. The computing device may allow the player to look around and/or navigate the virtual environment through detecting movement of the computing device relative to the virtual environment. For example, if the player moves the computing device in the real world, the computing device may detect its new orientation and pan to show a different portion of the virtual environment. Thus, by moving the computing device around, the player may be able to "look around" and explore the virtual environment.

Some embodiments may further incorporate virtual reality headsets or other forms of immersive display to provide the player with an enhanced experience. A player may be presented with a virtual dance venue in the virtual reality headset, and the computing device may detect movements of the player and translate these to corresponding movements and/or camera commands in the virtual reality environment. Further still, the virtual reality headset may be used to present the user's real world environment as an exciting dance venue with the user's avatar and other characters appearing in the user's surroundings. For example, a player wearing a virtual reality headset in a living room may see his avatar standing in the middle of the room dancing in front of a crowd of spectators. As described above, the computing device may animate the avatar and the crowd based on gameplay performance of the user. As the player hits the correct beats with proper timing, the user's living room may come alive with the sights and sounds of an exciting dance club.

Dancers appearing in the user's environment may be animated to teach the player how to perform the dance themselves. For example, the user's avatar may perform a dance and the computing device may present the player with prompts and instructions to mimic the dance performed by the avatar.

In one example, a player may be playing the rhythm game on his smartphone in a subway station. When the player selects an augmented reality dance venue, an integrated camera of the smartphone may activate and capture image data of the subway station. The image data may be used by the computing device to generate a display of the subway station as a dance venue, having the user's avatar standing on a subway platform feature included in the image data, for example. As the player moves the phone around and the camera captures different portions of the subway station environment, the avatar may be animated as remaining on the identified subway platform feature and thus may move around the display as appropriate. In this way, the augmented reality game may present virtual objects that, to the user, appear to be real-world objects when the scene is viewed on the smartphone display. If the camera is moved such that the feature is no longer included in the image data, the computing device may suppress a display of the avatar (who would be offscreen) or may dynamically determine a new feature for anchoring the avatar.

In some embodiments, the rhythm game may incorporate advertisements in a game display. The advertisements may be selected based on the physical location of the computing device. For example, the advertisements may be for local shops (and/or other sponsors) and services and may be incorporated into the augmented reality experience.

In some embodiments, and as noted above, the image data of the real world environment may be modified and/or enhanced by the computing device in generating the augmented reality dance venue. The rhythm game may display other characters, other avatars, items, special effects, and other objects in the displayed real world environment. Continuing the example above, the computing device may add other dancing characters to the augmented reality environment in addition to the avatar superimposed on the image data of the subway station. The computing device may also, for example, add exciting lighting effects and decorations to the image data to create the appearance of a more interesting and livelier dance venue.

In some embodiments, the computing device may dynamically switch between virtual environments and augmented reality venues. For example, if a player is playing the rhythm game on a desk with the camera's view of the room being blocked by the desk, the computing device may play the game in full virtual reality, instead of augmented reality, mode. In the full virtual reality mode, the display may present a graphical environment that does not use an image captured by the camera. Instead, the graphical environment may be a virtual one, similar to traditional video games. In such a mode, the avatar would be shown dancing in a purely virtual dance club on the user's display screen. However, when the player picks up the device and begins to move through the real world environment, and the view of the room is no longer blocked by the desk, the system may detect the movement and the absence of the obstruction, and automatically switch to an augmented reality display incorporating image data captured by the camera as the player moves through the real world environment, and presenting the game in an augmented reality mode. In such a mode, the user is presented with an image showing what the rear camera 112 captures of the user's environment, with overlaid graphical images of virtual objects that the game has added to the real-world environment. This may allow the user, for example, to see where he is going while still maintaining focus on the rhythm game by "seeing through the phone."

In step 240, which may comprise substeps 241-254, the system may begin the portion of the game that comprises the rhythm task. For example, the rhythm task may require the player to observe the touch targets emanating from behind the player's avatar, and the touch targets may grow larger as they approach the user's camera. The targets reach a predetermined size at a predetermined time, in rhythm with the music of the selected song, and at that time the user must accurately touch the target on the display screen. If the user accomplishes this task, then the user is credited with completing the task for that particular target (or musical note in the game), and a corresponding score may be awarded to the user.

In step 241, the previously selected song may begin playing using the speakers of the mobile device, and may begin to show targets on the screen.

In step 242, and as illustrated in FIG. 7A, the system may create a number of targets 700a-c for the player to interact with. The targets may be portrayed as, for example, musical notes, stars, circles, arrows, or other shapes. The targets may be created within the virtual environment scene so that they appear to be approaching the player from a distant point, and may originate behind the avatar or at another designated point such as a speaker system generated within the virtual club. The player may be intended to engage the targets on the beat of the music or at a predetermined time by tapping a region 705 that surrounds them on a touchscreen. Alternatively, another input method such as shaking the mobile device or giving a verbal command picked up by a microphone may engage the target.

In step 243, the system begins animating both the targets and a dance of the avatar. Targets may become bigger as they approach the time that the player is supposed to engage with them creating the effect that the targets are actually moving through space towards the player, and may change color and/or size to indicate when they are to be touched.

Figure 6:
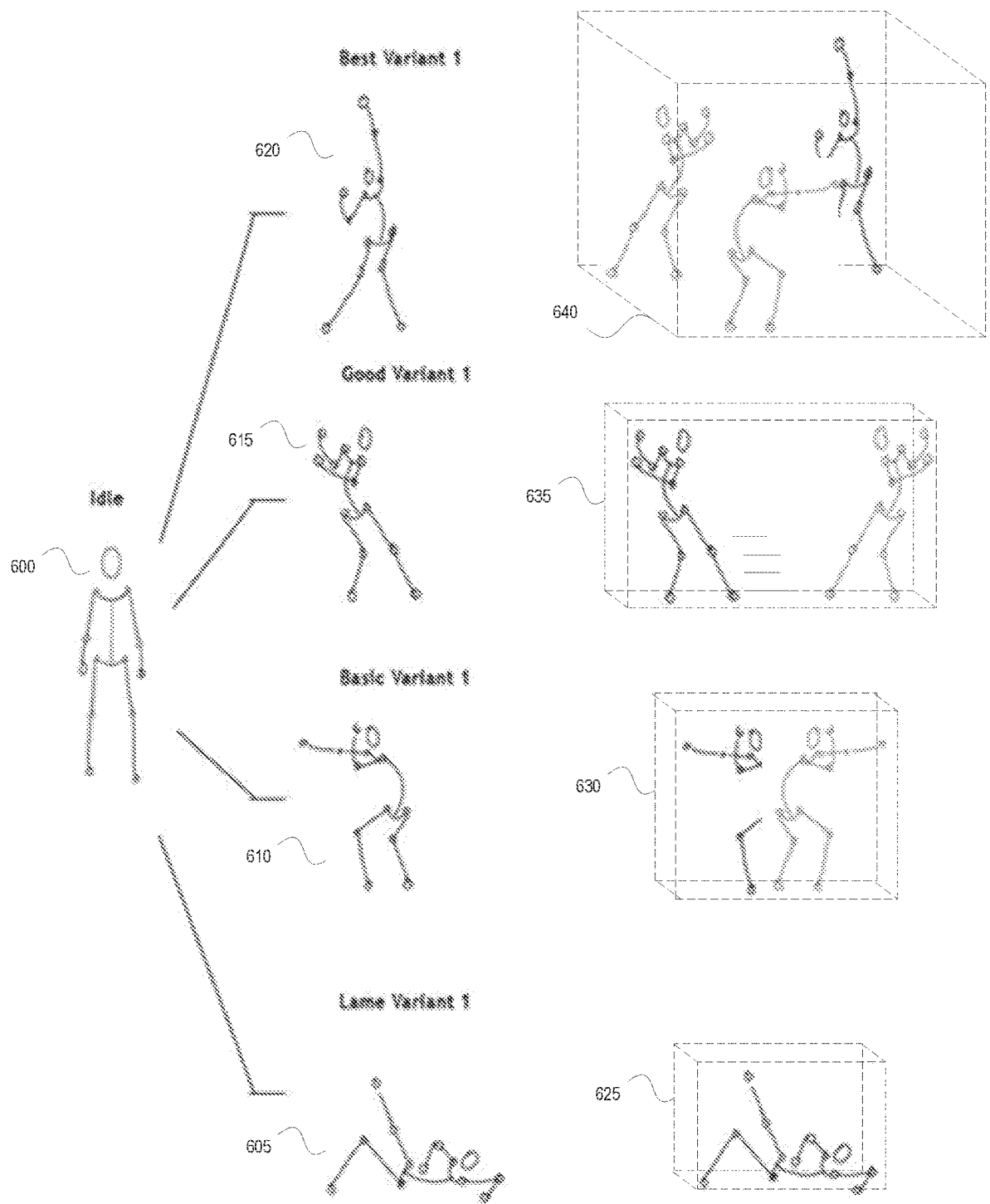
FIG. 6 illustrates a possible set of dances for an avatar, based on a player's skill and the available dancing zone, according to aspects described herein.

An avatar's dance, illustrated in FIG. 6, may start in an "idle" mode 600 where the character stands or bounces lightly without any lateral movement. The idle animation, and other dancing animations 605-620, may be animations of approximately two to four seconds in length.

In step 247, the system checks whether the animation is complete. If it is, then in step 248, another animation may be chosen based on the current performance of the player and the available dancing zone. As will be explained below, the various available dance moves for the player's avatar may have different criteria for selection, and the criteria may be stored in a data structure in memory.

One such criterion may be a virtual energy level of the player's avatar. During a gameplay session, the rhythm game may track an energy level associated with the player. The energy level may be a proxy for a score—if the player hits the touch targets and/or other gameplay elements of the rhythm game with poor timing, or hits the wrong targets, the computing device may remove energy points from the player's energy level. If the player's energy level is exhausted below a predetermined minimum, the gameplay session may end and the player may be forced to restart. If the player hits the touch targets with good timing and consistently hits the right ones, the computing device may add energy points to the player's energy level, thereby continuing the gameplay session. The data structure for a particular animation may indicate, for example, a first minimum required energy level. FIG. 6 illustrates a variety of available dance animation variations 605, 610, 615, and 620. The variants may have energy level requirements that range from low (for the Lame Variant 605) to high (for the Best Variant 620).

If a player has a low energy level (e.g., below a minimum threshold value), the system may select the "lame" animation 605, where, for example, the avatar falls down and struggles. If a player has a moderate energy level, the system may begin playing "basic" animation 610, where, for example, the avatar begins to dance with minimal lateral movement. If a player has a slightly higher energy level, the system may begin playing "good" animation 615, which becomes more intricate and includes even greater lateral movements. If a player has a high energy level above a certain threshold, the system may begin playing "best" animation 620, which may include both lateral and forward-and-backward movements and be the most visually impressive of all the dances.

Another criterion may be the available dance volume 320/330. FIG. 6 illustrates example volumes 625, 630, 635, 640 corresponding to the dance animation variations discussed above. Even if a player has a sufficient energy level, a preferred dance may not be possible because its bounding volume 625-640 is greater than the available dancing zone previously determined. If the preferred dance will not fit without causing the avatar to enter a wall or other obstacle, a dance associated with a smaller volume will be chosen. If needed, a dance having a lower energy level and having a smaller bounding volume may instead be selected to be played.

Another criterion may be the existence of real-world and/or virtual interacting objects in the environment. For example, some dance animations may require that the avatar interact with another object, such as a wall or a chair. When selecting an animation, the system may determine what interacting objects are in the dancing environment, and may select the next dance animation based on what interacting objects are available and required.

Another criterion may be the rate (e.g., beats-per-minute) at which the avatar is expected to move in the song. Some songs are faster than others, and the speed of a song's music may dictate the type of dance animation to use.

Another criterion may be the song type. Different genres or styles of song may be associated with different types of dancing, and the game system may attempt to select dance moves accordingly. For example, country music may be associated with square dancing and line dancing moves, while classical music may be associated with ballroom dancing moves. The data structure storing the animation criteria may indicate song type(s) that are ideal and/or discourage, and this criterion may be factored into the selection of a dance animation.

Another criterion may be the player's own profile. For example, some players may indicate their preferred dance moves. Some dance moves may be unlocked or purchased by the player, while others may be prohibited until the player achieves a predetermined score or otherwise satisfies a requirement for obtaining the move.

Players may also be allowed to create their own dance moves, in some embodiments. The game may provide an editor where users may be able to create a sequence of actions by dragging the avatar's joints in their own desired pattern. Each move created may start and end in an idle pose. The game may limit the player's edits based on how far in the game the player has progress. For example, if the player has attained a fifth level, the player may be limited to moving 5 joints whereas a tenth level player may be able to edit 10 joints on the avatar.

The system may dynamically adjust aspects of a displayed dance venue based on the gameplay performance of the user. This may provide a particularly enhanced player experience in combination with the augmented reality techniques described above. The user's avatar may interact with the other characters, items, objects, etc. Some interactions may impact an evaluation of the user's gameplay performance. For example, if the player interacts with a chair or other item while the avatar dances during a gameplay session, the rhythm game may assign a higher score to the performance and animate the avatar as performing interesting and exciting dance moves incorporating the chair (or other objects).

In some embodiments, there may be different difficulty levels associated with different dance venues. For example, in a dance club ranked at a high difficulty level, the rhythm game may make it harder to complete the "easy" dance moves to reflect increased pressure associated with such a venue (such as by reducing a size of the gameplay elements, increasing the complexity of a pattern of beats, reducing a time threshold for "good" timing, etc.). Accordingly, the dance venue may be another criterion used in step 248 to select an animation.

In step 249, the system may check if the player has provided input, for example, by tapping or swiping a finger on a touchscreen.

If there is input, in step 250, the system may determine whether the input was responsive to and engaged one of the targets. For example, a target may require a player to tap a particular region of the screen, and the tap may be outside of that region, or a target may not be ripe until tapped on the beat of the music, and the input may be too early or too late for the given target. If the touch successfully engaged with a target at the target's correct timing in the song, the player may be awarded points. If the touch missed a target, or was not at the correct timing in the song, then the player may lose points.

Then, in step 251, the system may react to the input by increasing the player's score, energy level, or other player attributes. After the player's attributes have been updated, the system may take steps to reward the player for good performance so far or adjust the difficulty level of the game to keep the player from growing bored. If there is no input responsive to a target, the system may continue animating, per step 243.

In some embodiments, the computing device may add additional characters, avatars, items, objects, special effects, and the like to the virtual environment based on the gameplay performance of the user. Similarly, the computing device may modify aspects of any of these elements of the virtual environment based on the gameplay performance as well.

For example, as a gameplay session proceeds and the player performs with good timing, the computing device may add special effects such as flashing lights to create an even more exciting dance venue. Other characters may be added as "spectators" coming to watch the user's good performance. As the player continues to perform at a high level, these spectators may be animated as becoming more and more excited. If the player is performing poorly, other characters may "leave" and be removed from display or may be animated as displeased or "booing" the avatar's dancing, for example.

Certain changes to the virtual environment or features of the real environment overlaid by the augmented reality features may be used to increase the difficulty of the rhythm game. Some example embodiments of increased difficulty are illustrated in FIGS. 8a-c.

Figure 8A:
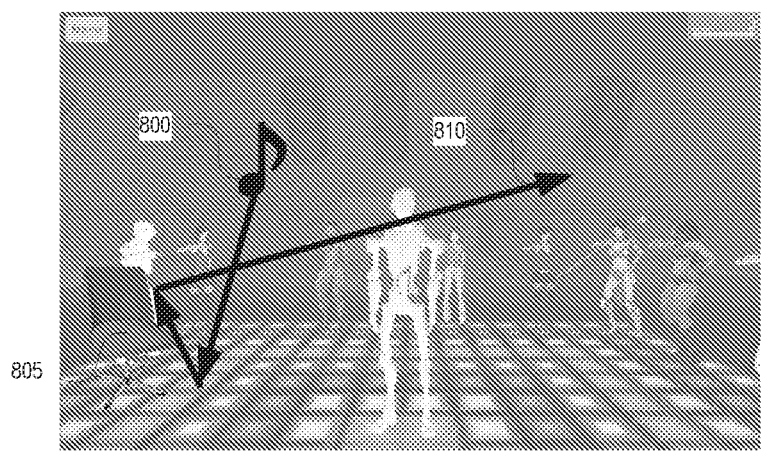
FIGS. 8a-c illustrates a series of methods of incorporating additional challenges to a rhythm game in an augmented reality system, according to aspects described herein.

In FIG. 8a, a rhythm target 800 may, instead of flying directly at the camera on the screen, interact with the real environment or the virtual environment. For example, the target may move towards the floor of the real environment, and may bounce off of it. Subsequently, its path may hit virtual environment furniture 805 that was previously created by the system, and take a new trajectory 810 across the screen that is much more difficult to engage successfully. Any number of determined elements of the real environment or created elements of the virtual environment may be used to obscure, reflect, or interfere with the path of a target, and these changes in direction of the target will make the target harder to touch, thereby increasing the difficulty of the game. In some embodiments, the point of origin from which the targets originate may change. For example, instead of emanating from the player's avatar, the targets may originate from a different avatar in the augmented reality environment. At some difficulty levels, there may be multiple points of origin from which the targets may emanate. Targets may further emanate from other elements of the virtual environment, such as speaker systems generated within the environment, or may be emanated from actual speaker systems detected in video captured of a room in which the player is playing the game.

Figure 8B:
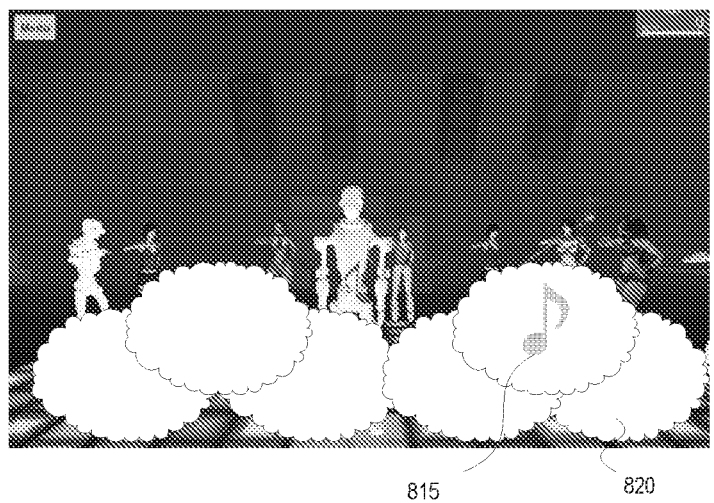

In FIG. 8b, a rhythm target 815 may be obscured by a fog or cloud animation 820 that makes seeing the target much more difficult. The fog effect may be triggered by improved player performance in the game, or alternatively may be triggered to correspond to a fog-like effect observed by the camera in the real environment, such as actual fog, smoke, or dry ice effects. Instead of fog, other visual filters may be applied to the screen to obscure targets or make engaging them more difficult. Elements of the club could appear to catch on fire and produce distracting light or obscuring smoke, or the entire screen's lighting, coloration, or focus may change to disorient the player.

Figure 8C:
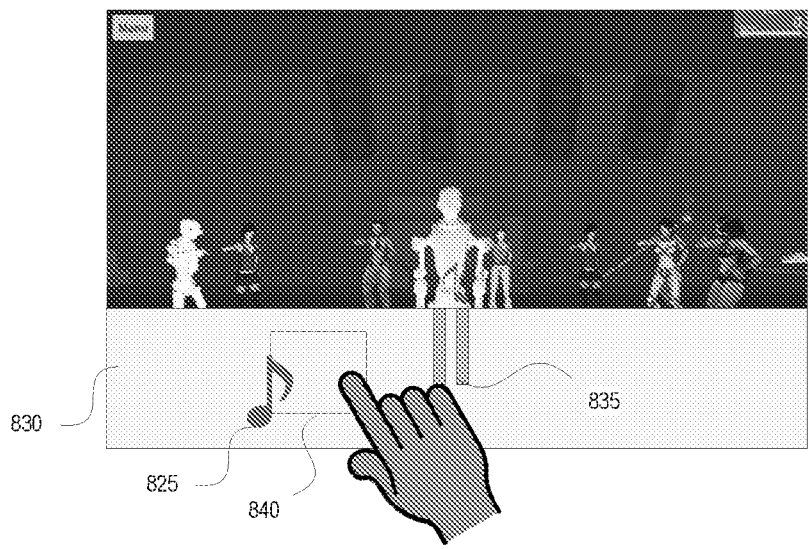

In FIG. 8c, the virtual environment may appear to be flooded with water 830, and targets 825 may appear to come from beneath the surface of the water. The avatar 835 may also appear to be submerged, and the dancing of the avatar or available dance animations may be affected to be more sluggish. The difficulty may be increased by simulating the refraction of light through water, such that engaging a target requires engaging a region of the screen 840 that is not directly over the target, as if the water is bending the light from the target. The water effect may be triggered by a player's performance exceeding a particular threshold, or alternatively may be triggered by the actual presence of water in the real environment, if for example the player directed the camera towards a swimming pool, lake, ocean, or other body of water during initialization.

In an alternative embodiment that may decrease difficulty, if a player orients the camera towards a sky or ceiling during initialization, the avatar may appear to be floating in the air. Targets may float lazily and be easier to engage, and different dances may be demonstrated by the avatar to simulate a zero-gravity effect of the avatar floating or flying as they dance.

In some embodiments, the player may be allowed to swap control of his avatar for another avatar or character displayed in the dance environment. For example, the player may tap or otherwise select another avatar for use in the dance environment. As another example, the player may physically orient the camera in his device in the direction that the avatar is animated in the virtual world of the interactive rhythm game. Once the player has focused on the other avatar for a predetermined threshold amount of time, control may shift to the other avatar. As a result, the computing device may shift a display focus to the newly selected avatar and animate the newly selected avatar in accordance with the user's gameplay performance as described above. Switching avatars may change the displayed gameplay elements such as by changing a color of the beat icons, for example. In some embodiments, different avatars may be associated with different styles of gameplay. For example, the player may start with a first avatar that is associated with quick and easy patterns of beats, resulting in an easier game session. However, the player may swap to a second avatar who joins the dancing session and is associated with a complex pattern, thereby allowing the player to step up to a higher level of difficulty and/or a different style of gameplay.

After adjusting the difficulty, the system may check whether the song has completed playing in step 252, and if not, it may return to step 242 to create more rhythm targets for the rest of the song.

In step 249, if there is no input, the system may proceed to step 253 and may determine if any rhythm target(s) were required to be touched but were missed. As noted above, a rhythm target may be required to be touched if it has reached a predetermined point in the environment, or reached a predetermined size on the display screen, and this usually will occur in time synchronization with a particular musical beat or moment in the song being played. If no targets were missed, the animations of the entire dance venue, avatar, targets, NPCs, etc. may be updated as steps 243 and 248 may be repeated.

If there was a missed target in step 253, the system may next determine, in step 254, whether the player has entered an exploration mode.

Exploration mode may be a mode in which the player has decided to move the camera to view other areas of the player's environment. For example, if the game began with the player's avatar in the corner of the room, and the note targets are emanating from that corner position, the player may rotate the smartphone so that the corner is no longer visible to the smartphone's rear camera. By doing so, the point of origin for the notes is no longer visible, and when the point of origin for the notes is no longer visible, the game may enter an exploration mode.

Figure 9A:
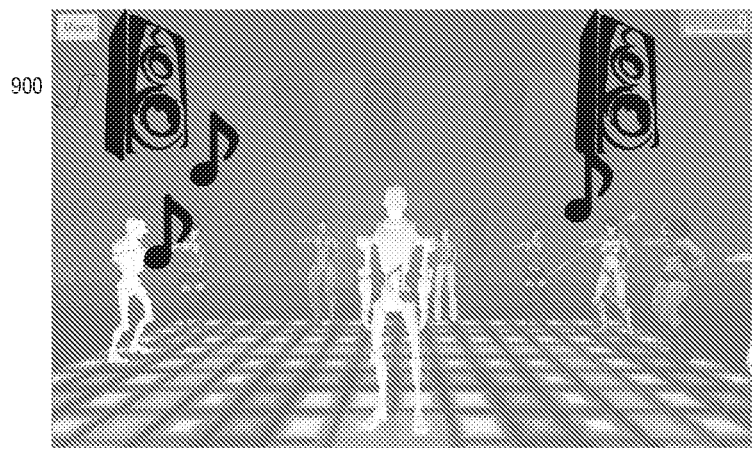
FIGS. 9a-c illustrate further features of incorporating a generated virtual environment into a rhythm game, according to aspects described herein.
Figure 9B:
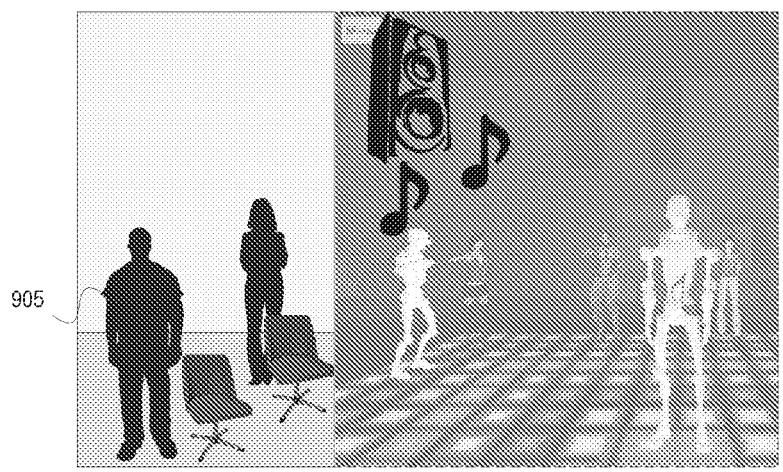
Figure 9C:
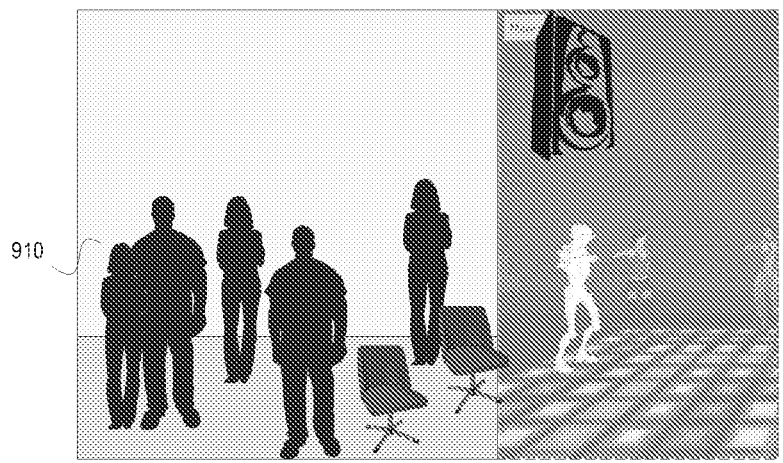

An example of an explore mode is illustrated in FIGS. 9*a-c*. The player may move or pivot the camera in the x, y, and z directions during play, while the avatar may remain in the same apparent anchored location in the virtual environment. As the player pans from centered on the avatar, in FIG. 9*a*, to the avatar being at the edge of the screen, in FIG. 9*b*, to the avatar being entirely off screen, in FIG. 9*c*, the rhythm targets may stop being generated, and the player may be able to simply enjoy the music without penalty, observe the NPCs that are interacting with the avatar, or observe the virtual environment and even explore it while walking around. Alternatively, the targets may continue to be generated, and an indicator may be displayed when targets exist off screen for the player to engage.

Figure 10A:
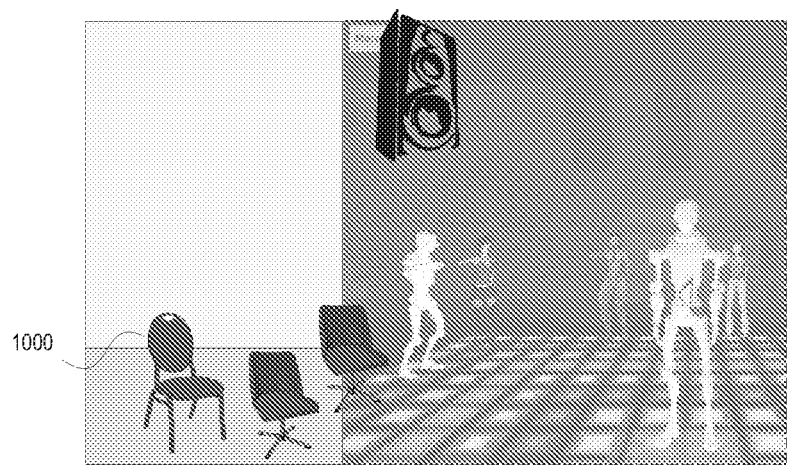
FIGS. 10a-c illustrate a method for a player changing a generated virtual environment by incorporating detected objects from a real environment into the virtual environment, according to aspects described herein.
Figure 10B:
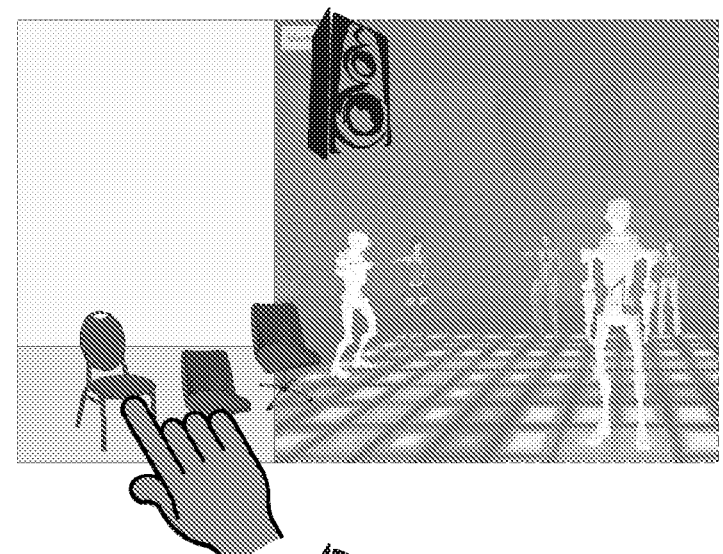
Figure 10C:
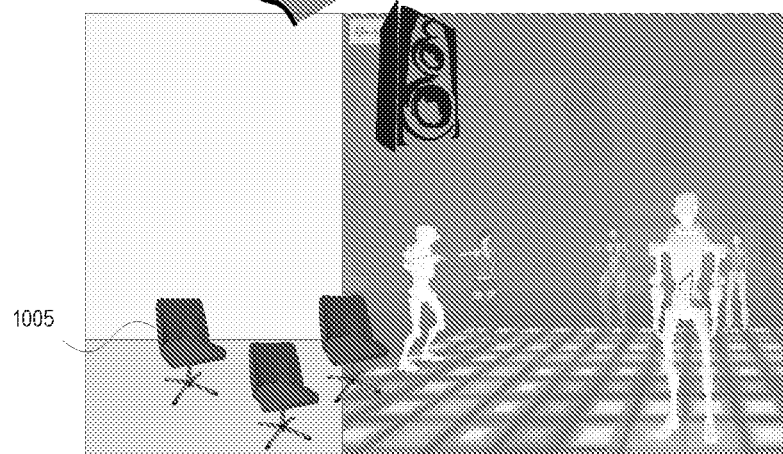

While in explore mode, the player may be able to interact with and augment the virtual reality, as illustrated in one example in FIGS. 10*a-c*. For example, the player may pivot the camera and see a real piece of furniture 1000. Upon selecting the furniture in FIG. 10*b*, the player may be able to overlay and replace the furniture with a piece of virtual furniture 1005 which matches the virtual environment's existing décor. Avatars may further interact with elements which have been added to the virtual reality by the player, increasing the player's immersion in the virtual environment.

A player may exit explore mode by focusing the camera back on the avatar. When explore mode ends, the rhythm task may resume with targets that must be engaged in order to prevent the rhythm task from being failed.

If a player misses a target while not in explore mode, the system may proceed to step 251 where, similarly to the response to a successful engagement with a target in step 250, the system may react to the missed input by decreasing the player's score, energy level, or other player attributes. After the player's attributes have been updated, the system may take steps to penalize the player for poor performance so far or adjust the difficulty level of the game to keep the player from growing despondent.

If in step 252 it is determined that the song has ended, in step 256, the system may generate a scoring debrief screen, indicating a final score for the song, the winner of a multiplayer game, a percentage of targets engaged successfully, any features that were unlocked by the performance, a player leaderboard or scoring hall of fame, or any other statistics that rate the player's performance or compare that performance to the performance of one or more other players.

In step 257, the system may update the player's profile to include any unlocked features or game content. The player may also be rewarded with in-game credits based on a performance during a gameplay session. In some embodiments, the in-game credits may be a cryptocurrency associated with the rhythm game. Users may be able to use the rewarded in-game credits to purchase additional dance venues, customizations for avatars, music tracks, and other additional game features. Further, users may be able to use the rewarded in-game credits to purchase items outside the game such as a music soundtrack including music tracks from the game tickets to concerts by performers.

In some embodiments, the in-game credits may be referred to as GG points. In other embodiments, the in-game credits may be a cryptocurrency called GG Coin, enabled by a blockchain technology adopted from Bitcoin and strengthened by intelligent software agents that provide immediate worldwide GG Coin settlement between players. The GG Coin blockchain explorer provides a browser for the public transaction ledger which is tamper-evident because Bitcoin Core technology, and the software agents, hash the transaction-containing blocks into an immutable blockchain. Each computer software agent in the GG Coin network may be identified by a self-signed X.509 cryptographic certificate that prevents impersonation and may be used to digitally sign all messages in the network. All message traffic between computers in the GG Coin network is encrypted with a high strength algorithm. Every transaction created by a GG Coin software agent may be a multi-signature transaction in which verifying peers provide the additional signatures required to issue the transaction. An attacker may be required to breach several peers in order to get all the private keys needed to steal GG Coins associated with the game, for example.

After updating the player profile and any other internally tracked statistics, the system may return to step 220 to begin another round of the game.

Figure 11A:
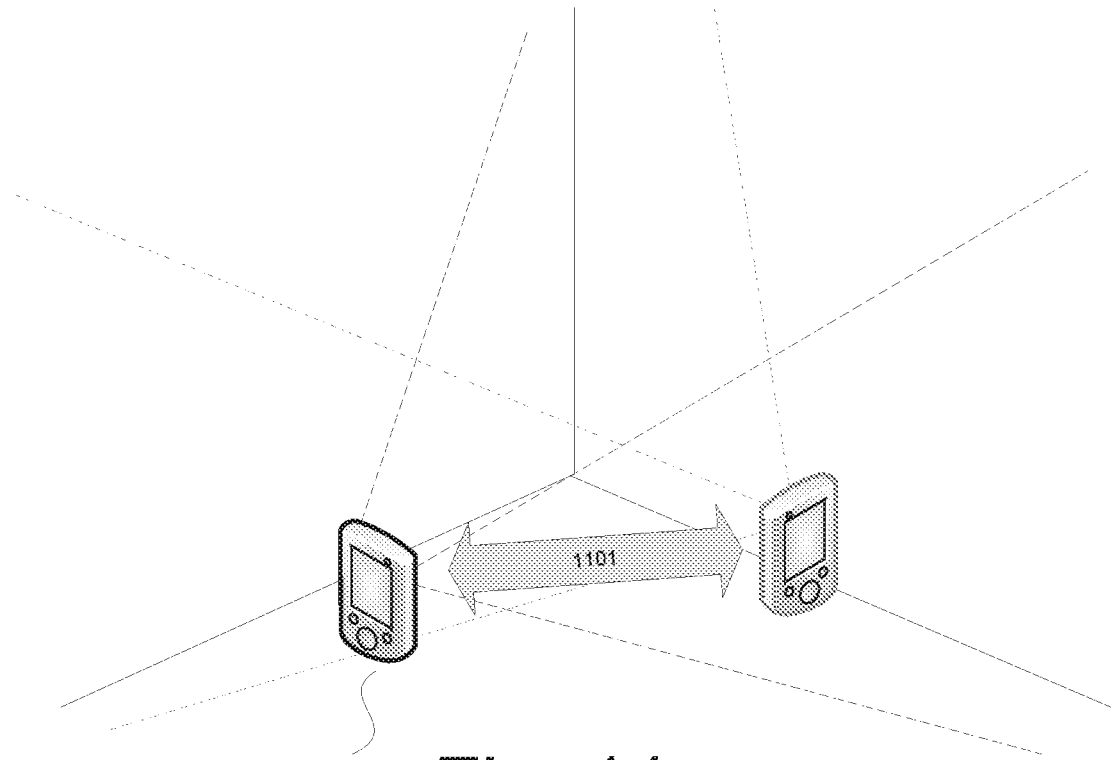
FIGS. 11a and 11b illustrate a method for providing multiplayer features in an augmented reality rhythm game, according to aspects described herein.

If, instead of playing in a single-player mode, the player did find an existing multiplayer game and join it in step 228, rather than generating a new virtual environment and selecting a song, the existing virtual environment of the multiplayer game's host may be used, as illustrated in FIG. 11.

In step 236, device 100 may open up a direct connection 1101 to second device 1100 and transmit the locations and appearances of features of the virtual environment previously created by that device during steps 231-233. Alternatively, an intermediate server computing device (having components such as those shown in FIG. 1, although in a larger form) may be used to determine the game play environment, and the various player devices may communicate with the server to send and receive updates based on the multiplayer gameplay.

Figure 11B:
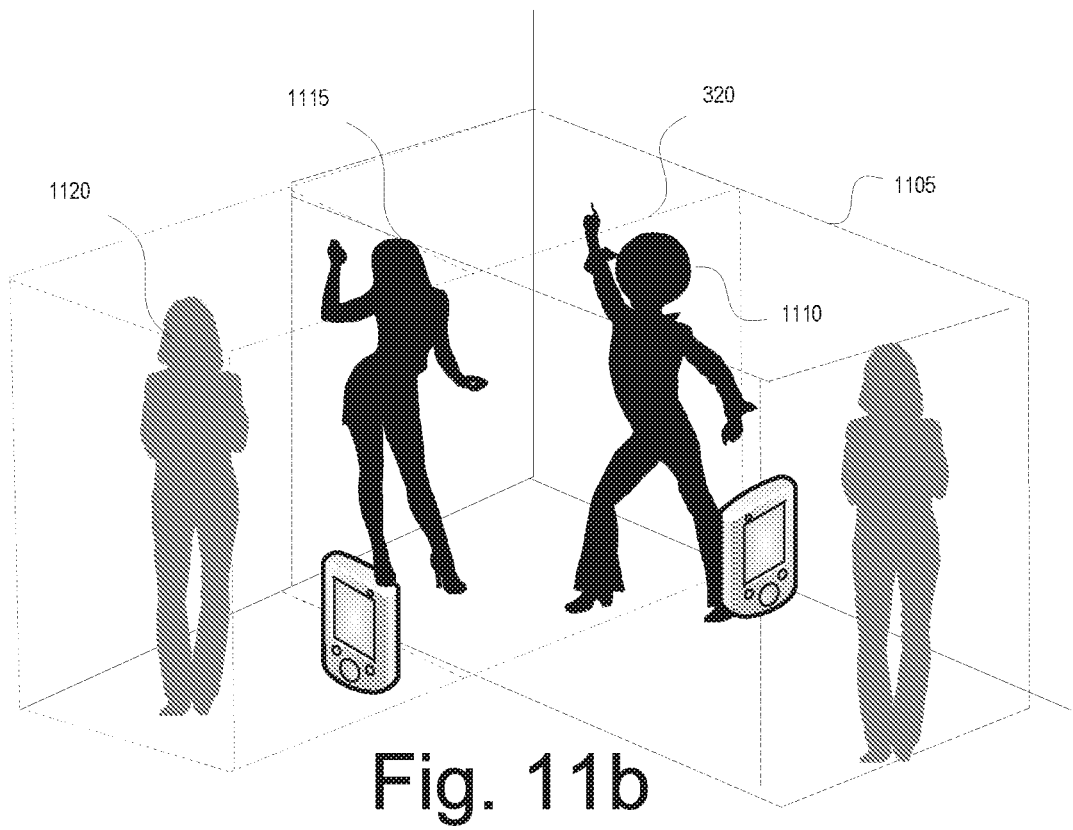

It is possible that the available dancing zones of the two players, after they have each previously and independently performed step 205 to determine dancing zones, may overlap, as in FIG. 11b. If there is overlap, the system may respond in step 237 by allowing the overlap, or by dividing the space between the two avatars and adjusting the stored dancing zones to ensure the avatars never appear to dance through one another. Alternatively, the system may present each player with the choice of manually adjusting the dancing zone or authorizing an overlapping dancing zone.

After the same virtual environment is shared by both players, they may able to see both players' avatars 1110 and 1115 dancing together, from perspectives appropriate to each player. Each player may have the same shared virtual environment, so that the same NPC 1120 may be seen by both players if their cameras are oriented towards that NPC.

The game may provide chat features allowing users to interact with other players in the augmented reality dance venue, in some embodiments. In some embodiments, the player may have the ability to chat with nearby players and in-game characters. Users may be free to wander around a virtual dance club and interact with other dancers. This may provide a live chatroom of people within a certain radius, in some implementations. The player interface of the computing device may indicate to the player which characters are available for chat, such as through use of an arrow marking available characters. Some characters may be staffed by live actors who speak and act like the character in order to provide a richer environment.

The interactive rhythm game may be associated with one or more social media platforms accessible via a web browser, mobile application, and the like. In some embodiments, a player may add friends and/or contacts from a social media platform to join them in the interactive rhythm game. In some embodiments, the interactive rhythm game may be hosted and/or otherwise launched by the social media platform and may allow players to challenge other users on the social media platform.

In some embodiments, a player may utilize a virtual reality headset to watch other players from around the world perform customized routines. Viewers may evaluate the routines and may choose to provide an in-game reward to the other players. For example, a viewer may designate an amount of in-game points and/or credits to reward another player with based on the quality of a routine. Performances may be viewed in 360 degrees utilizing the virtual reality capabilities of the headset, which may provide an immersive experience for the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Appendices A and B, which are appended to the following pages, include examples of computer-readable instructions which may be used to implement one or more aspects described herein.

APPENDIX A

Target Generation and Randomization

```
using UnityEngine;
using System.Collections;
namespace BoogieDownGames {
    //public enum NoteStates {UnReady, LowScore, MidScore, HighScore, Die}
    public class ArNotesControl : MonoBehaviour {
        [SerializeField]
        private Vector3 m_vect;
        [SerializeField]
        private float m_speed;
        [SerializeField]
        private int m_maxTimeTillChange;
        [SerializeField]
        private TimeKeeper m_timer;
        [SerializeField]
        private SkinnedMeshRenderer m_mat;
        [SerializeField]
        private NoteStates m_myState;
        [SerializeField]
        private float m_firstBounds;
```

APPENDIX A-continued

| Target Generation and Randomization |
|---|

```
            [SerializeField]
            private float m_secondBounds;
            [SerializeField]
            private float m_thirdBounds;
            [SerializeField]
            private float m_dieBounds;
            [SerializeField]
            private Color m_unReadyColor;
            [SerializeField]
            private Color m_lowScoreColor;
            [SerializeField]
            private Color m_midScoreColor;
            [SerializeField]
            private Color m_highScoreColor;
            private float m_rotation;
            private Vector3 m_direction;
            private GameObject m_mainCamera;
            private float m_zLimit;
            private float zDistanceFromCamera;
    private bool isNormal;
            void Start ( )
            {
                    m_myState = NoteStates.UnReady;
                    // Note must move from transform.position to camera position
                    //m_mainCamera = GameObject.FindGameObjectWithTag ("MainCamera");
    m_mainCamera = GameObject.FindGameObjectWithTag ("GameController");
                    m_zLimit = m_mainCamera.transform.position.z;
    NotificationCenter.DefaultCenter.AddObserver(this,"OnStateRunFixedUpdate");
    NotificationCenter.DefaultCenter.AddObserver(this,"OnStateRunUpdate");
    NotificationCenter.DefaultCenter.AddObserver(this,"OnStateLostSongEnter");
                    // to provide some variety, flip half the notes
                    if (Random.value > 0.5) {
        isNormal = false;
         transform.localRotation = transform.localRotation * Quaternion.Euler(0, 180,
    0);
                            m_direction = Vector3.forward;
    // Send notes off in slightly random directions but toward the camera
    float x = Random.Range(-0.125f, 0.125f);
    float y = Random.Range(-0.125f, 0.125f);
    m_direction = new Vector3(m_direction.x - 60*x, m_direction.y - 10*y, -
30*m_direction.z);
        } else {
        isNormal = true;
        transform.localRotation = transform.localRotation * Quaternion.Euler(0, 0, 180);
        m_direction = new Vector3(1.0f,1.0f;1.0f);
        // Send notes off in slightly random directions but toward the camera
        float x = Random.Range(-0.125f, 0.125f);
        float y = Random.Range(-0.125f, 0.125f);
        m_direction = new Vector3(m_direction.x + 60*x, m_direction.y - 10*y ,
30*m_direction.z);
        }
                    }
            public void OnStateRunFixedUpdate( )
            {
                    transform.Translate(m_direction * m_speed);
            }
            public void OnStateRunUpdate( )
            {
                    CheckState( );
            }
            public void death( )
            {
                    if (m_myState != NoteStates.UnReady && m_myState != NoteStates.Die)
{
                            DanceGameController.Instance.NoteWasHit (m_myState);
                            gameObject.SetActive (false);
                    } else {
                            DanceGameController.Instance.NoteWasMissed ( );
                    }
                    PostMessage("PlayEvent", m_myState.ToString( ));
            }
            public void OnStateLostSongEnter( )
            {
                    gameObject.SetActive(false);
            }
```

APPENDIX A-continued

Target Generation and Randomization

```
            public void CheckState( )
            {
    zDistanceFromCamera = m_zLimit - transform.position.z;
    //if (isNormal)
    {
        if (zDistanceFromCamera > m_firstBounds) {
            m_myState = NoteStates.UnReady;
            m_mat.sharedMaterial.SetColor("_Color", m_unReadyColor);
            m_mat.sharedMaterial.SetColor("_Emission", m_unReadyColor);
            m_mat.sharedMaterial.SetColor("_SpecColor", m_unReadyColor);
        } else if (zDistanceFromCamera <= m_firstBounds && zDistanceFromCamera > m_secondBounds) {
            m_mat.sharedMaterial.SetColor("_Color", m_lowScoreColor);
            m_mat.sharedMaterial.SetColor("_Emission", m_lowScoreColor);
            m_mat.sharedMaterial.SetColor("_SpecColor", m_lowScoreColor);
            m_myState = NoteStates.LowScore;
        } else if (zDistanceFromCamera <= m_secondBounds && zDistanceFromCamera > m_thirdBounds) {
            m_mat.sharedMaterial.SetColor("_Color", m_midScoreColor);
            m_mat.sharedMaterial.SetColor("_Emission", m_midScoreColor);
            m_mat.sharedMaterial.SetColor("_SpecColor", m_midScoreColor);
            m_myState = NoteStates.MidScore;
        } else if (zDistanceFromCamera > m_thirdBounds && zDistanceFromCamera > m_dieBounds) {
            m_mat.sharedMaterial.SetColor("_Color", m_highScoreColor);
            m_mat.sharedMaterial.SetColor("_Emission", m_highScoreColor);
            m_mat.sharedMaterial.SetColor("_SpecColor", m_highScoreColor);
            m_myState = NoteStates.HighScore;
        } else {
            // if passes the camera this is a missed note
            gameObject.SetActive(false);
            DanceGameController.Instance.NoteWasMissed ( );
        }
        m_myState = NoteStates.HighScore;
    }
        }
        public void PostMessage(string p_func, string p_message)
        {
            Hashtable dat = new Hashtable( );
            dat.Add("eventName", p_message);
            NotificationCenter.DefaultCenter.PostNotification(this, p_func, dat);
        }
        public void PostMessage(string p_func, string p_key, string p_message)
        {
            Hashtable dat = new Hashtable( );
            dat.Add(p_key,p_message);
            NotificationCenter.DefaultCenter.PostNotification(this, p_func, dat);
        }
    }
}
```

APPENDIX B

Texture Selection

```
//Track what screenshot number it is, based on values 0-9
private string screenShotNum = "screenShotNum";
private int screenShot;
//Track what screenshot is being used as the texture, based on player selection
private string loadScreenNum = "Load Screen Number";
private int loadNum;
//Array for screenshot numbers selected within the game
int[ ] screenShotIndex;
//List to hold the screenshots after then are converted to textures
public List<Texture2D> screenShotTextures;
//Rect to determine the size of the taken screenshot
public Rect capRect;
//Main camera of the scene
public Camera cam;
void Awake( ){
    //If this is the first time playing, Unity will populate these variables with
    //default values
```

APPENDIX B-continued

Texture Selection

```
        if (!PlayerPrefs.HasKey(screenShotNum))
            PlayerPrefs.SetInt(screenShotNum, 0);
        if (!PlayerPrefs.HasKey(loadScreenNum))
            PlayerPrefs.SetInt(loadScreenNum, -1);
        //We then set the variables equal to the saved values and save the values to
        //Unity
        screenShot = PlayerPrefs.GetInt(screenShotNum);
        loadNum = PlayerPrefs.GetInt(loadScreenNum);
        PlayerPrefs.Save( );
    }
    void Start( ){
        //At the start we load any previously taken textures into the texture list
        LoadScreenShots( );
        //Set the capture range of the screenshot and set the resolution as 256 x 256
        capRect.xMin = (Screen.width - 256) / 2;
        capRect.yMin = (Screen.height - 256) / 2;
        capRect.width = 256;
        capRect.height = 256;
    }
    public void ScreenShot( ){
        //Start the screenshot process and tell the script to run the SaveScreenShot( )
        function
        if (Application.platform != RuntimePlatform.WindowsEditor){
            StartCoroutine(SaveScreenShot( ));
        }
        else {
            StartCoroutine(SaveScreenShot( ));
        }
    }
    //Uses current screenshot integer to create a save name for the screenshot
    void TrackIndex( ){
        //Check if the max number of screenshots has been reached, if not, then increase
        the screen shot number
        if (screenShot <= 8)
            screenShot++;
        //If the max has been reached, then reset the screenshot numbers
        else screenShot = 0;
        //If there have been less than 9 screenshots saved, then we increase the number
        of textures to load
        if (loadNum < 9)
            loadNum++;
        //We then save all values to Unity's system
        PlayerPrefs.SetInt(screenShotNum, screenShot);
        PlayerPrefs.SetInt(loadScreenNum, loadNum);
        PlayerPrefs.Save( );
    }
    public IEnumerator SaveScreenShot( ){
        yield return new WaitForEndOfFrame( );
        //We set the resolution scaling number. This will increase the resolution of our
        screenshot
        int resoFactor = 2;
        //Make screenshot a texture based on the rect size we specified earlier
        Texture2D tex = new Texture2D((int)capRect.width * resoFactor,
        (int)capRect.height * resoFactor, TextureFormat.ARGB32, false);
        //Increase the resolution of the original capture to make the image bigger and
        better looking
        RenderTexture texRen = new RenderTexture(Screen.width * resoFactor, Screen.height
        * resoFactor, 24, RenderTextureFormat.ARGB32);
        RenderTexture.active = texRen;
        //Tell the main camera what texture to look at and render
        cam.targetTexture = texRen;
        cam.Render( );
        //Create a new Rect based on the dimensions of the old rect x the resolution
        integer
        Rect capRect2 = new Rect(capRect.xMin * resoFactor, capRect.yMin * resoFactor,
        capRect.width * resoFactor, capRect.height * resoFactor);
        //We then tell the texture to capture the pixles within the new rect's bounds
        tex.ReadPixels(capRect2, 0, 0);
        //Then apply the new bounds to the texture
        tex.Apply( );
        //The texture is converted into a .png file for saving
        var bytes = tex.EncodeToPNG( );
        //We then reset the values of the camera and texture above to prepare for a new
        screenshot later
        RenderTexture.active = null;
        cam.targetTexture = null;
        //Save the texture to the Unity system based on the platform the game is being
        played on
```

APPENDIX B-continued

Texture Selection

```
        if (Application.platform != RuntimePlatform.WindowsEditor)
            File.WriteAllBytes(Application.persistentDataPath + "/Screenshot" +
    screenShot + ".png", bytes);
        else File.WriteAllBytes(Application.dataPath + "/Screenshot" + screenShot +
    ".png", bytes);
        //Increase the number of screenshots the player has taken
        TrackIndex( );
    }
    void LoadScreenShots( ){
        //for loop to add each taken screenshot to a list the player can choose from
        for (int i = 0; i <= loadNum; i++){
            byte[ ] file;
            //We make sure the texture is a 1×1 file
            Texture2D tex = new Texture2D(1, 1);
            //check which platform game is being run on to decide how searching will
            occur
            //If the platform is not the Unity editor...
            if (Application.platform != RuntimePlatform.WindowsEditor){
                //Check if there is a file located at the following path within Unity's
                game folders
                if (File.ReadAllBytes(Application.persistentDataPath + "/Screenshot" + 1
                + ".png") != null){
                    //if there is a file, set it into the byte file
                    file = File.ReadAllBytes(Application.persistentDataPath +
                    "/Screenshot" + i + ".png");
                    //We then load the texture located at the byte file we just specified
                    //We check if there is a texture located at the specified location
                    if (tex.LoadImage(file) != False){
                        //if there is a texture located at the specified location
                        //we check the list to make sure we are not overwriting a texture
                        already in the list
                        if (screenShotTextures[i] != null){
                            //If there is already a texture at this spot in the list, we
                            remove it and add the new texture
                            screenShotTextures.RemoveAt(i);
                            screenShotTextures.Insert(i, tex);
                        }
                        //If there is not already a texture in this spot on the list,
                        then we simply add the texture to the list
                        else screenShotTextures.Insert(i, tex);
                    }else return;
                }
            }
        }
    }
}
```

I claim:

1. A method comprising:
   generating, by a computing device and for display on a touch screen, a video image in timed synchronization with a song, wherein the video image comprises:
   video captured by a camera associated with the computing device;
   one or more superimposed animated images of a player avatar; and
   one or more superimposed images of touch targets;
   determining touch screen positions at which the touch targets are required to be touched by a user of the computing device in timed synchronization with the song;
   detecting user touches on the touch screen; and
   generating a display indicating whether the user accurately touched the touch targets at the determined touch screen positions and in timed synchronization with the song.

2. The method of claim 1, further comprising: storing information indicating criteria associated with player avatar dance animations.

3. The method of claim 2, wherein a first player avatar dance animation comprises a criterion indicating a required amount of volume in an environment of the video captured by the camera.

4. The method of claim 2, wherein a first player avatar dance animation comprises a criterion indicating an associated energy score level.

5. The method of claim 2, wherein a first player avatar dance animation comprises a criterion indicating one or more required interactive objects.

6. The method of claim 1, further comprising:
   animating the touch targets towards respective touch screen positions; and
   causing the touch targets to change direction in response to collision with a virtual object or with a physical object in the video image.

7. The method of claim 1, further comprising: adding one or more virtual objects to the video image based on whether the user accurately touched the touch targets at the determined touch screen positions and in timed synchronization with the song.

8. The method of claim 1, further comprising: selecting a next animation for the player avatar based on whether the user accurately touched the touch targets at the determined touch screen positions and in timed synchronization with the song.

9. The method of claim 1, further comprising:
   receiving a user selection of a texture in the video captured by the camera; and applying the texture to one or more virtual objects in the video image.

10. The method of claim 1, further comprising: determining that the camera has been moved such than an origin point of the touch targets is no longer in a field of view of the camera, and in response, ceasing to display new touch targets in the video image.

11. An apparatus comprising:
one or more processors; and
memory storing instructions that, when executed by the one or more processors, cause the apparatus to:
generate, for display on a touch screen, a video image in timed synchronization with a song, wherein the video image comprises:
video captured by a camera associated with the apparatus;
one or more superimposed animated images of a player avatar; and
one or more superimposed images of touch targets;
determine touch screen positions at which the touch targets are required to be touched by a user of the apparatus in timed synchronization with the song;
detect user touches on the touch screen; and
generate a display indicating whether the user accurately touched the touch targets at the determined touch screen positions and in timed synchronization with the song.

12. The apparatus of claim 11, wherein the memory further stores information indicating criteria associated with player avatar dance animations.

13. The apparatus of claim 12, wherein a first player avatar dance animation comprises a criterion indicating a required amount of volume in an environment of the video captured by the camera.

14. The apparatus of claim 12, wherein a first player avatar dance animation comprises a criterion indicating an associated energy score level.

15. The apparatus of claim 12, wherein a first player avatar dance animation comprises a criterion indicating one or more required interactive objects.

16. The apparatus of claim 11, wherein the instructions, when executed by the one or more processors, further cause:
animating the touch targets towards respective touch screen positions; and
causing the touch targets to change direction in response to collision with a virtual object or with a physical object in the video image.

17. The apparatus of claim 11, wherein the instructions, when executed by the one or more processors, further cause:
adding one or more virtual objects to the video image based on whether the user accurately touched the touch targets at the determined touch screen positions and in timed synchronization with the song.

18. The apparatus of claim 11, wherein the instructions, when executed by the one or more processors, further cause:
selecting a next animation for the player avatar based on whether the user accurately touched the touch targets at the determined touch screen positions and in timed synchronization with the song.

19. The apparatus of claim 11, wherein the instructions, when executed by the one or more processors, further cause:
receiving a user selection of a texture in the video captured by the camera; and
applying the texture to one or more virtual objects in the video image.

20. The apparatus of claim 11, wherein the instructions, when executed by the one or more processors, further cause:
determining that the camera has been moved such than an origin point of the touch targets is no longer in a field of view of the camera, and in response, ceasing to display new touch targets in the video image.

* * * * *